US008621530B1

(12) United States Patent
Guzman et al.

(10) Patent No.: US 8,621,530 B1
(45) Date of Patent: Dec. 31, 2013

(54) METHOD AND SYSTEM FOR CONTROLLING USER DEVICES IN AN AGGREGATED CONTENT DISTRIBUTION SYSTEM

(75) Inventors: Jorge H. Guzman, Gaithersburg, MD (US); Drew T. Chen, Gaithersburg, MD (US); Richard B. Tatem, Middletown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 13/285,967

(22) Filed: Oct. 31, 2011

(51) Int. Cl.
H04N 7/20 (2006.01)
H04N 7/18 (2006.01)
H04N 7/173 (2011.01)
H04J 1/00 (2006.01)

(52) U.S. Cl.
USPC ............... 725/82; 725/63; 725/68; 725/71; 725/74; 725/78; 725/83; 725/85; 725/119; 370/343; 370/480

(58) Field of Classification Search
None
See application file for complete search history.

(56) References Cited

U.S. PATENT DOCUMENTS

| | | | |
|---|---|---|---|
| 5,058,138 A | 10/1991 | Figura et al. |
| 5,524,272 A | 6/1996 | Podowski et al. |
| 5,742,680 A | 4/1998 | Wilson |
| 5,883,677 A | 3/1999 | Hofmann |
| 5,970,386 A | 10/1999 | Williams |
| 6,104,908 A | 8/2000 | Schaffner et al. |
| 6,112,232 A | 8/2000 | Shahar et al. |
| 6,219,839 B1 | 4/2001 | Sampsell |
| 6,622,307 B1 | 9/2003 | Ho |
| 6,868,255 B1 | 3/2005 | Chanteau et al. |
| 7,533,400 B1 | 5/2009 | Hailey et al. |
| 7,546,623 B2 | 6/2009 | Ramraz et al. |
| 7,890,552 B2 | 2/2011 | Reichman |
| 8,046,806 B2 | 10/2011 | Wall et al. |
| 8,087,048 B2 | 12/2011 | Hassell et al. |
| 2002/0046406 A1 | 4/2002 | Chelehmal et al. |
| 2002/0080267 A1 | 6/2002 | Moluf |
| 2002/0087999 A1 | 7/2002 | Kashima |
| 2002/0116707 A1 | 8/2002 | Morris et al. |
| 2003/0053562 A1 | 3/2003 | Busson et al. |

(Continued)

FOREIGN PATENT DOCUMENTS

| | | |
|---|---|---|
| EP | 1605603 A1 | 12/2005 |
| WO | 2004054157 | 6/2004 |
| WO | 2007050081 | 5/2007 |

OTHER PUBLICATIONS

Anonymous; "Continuum DVP Dense QAM Array for Video-on-Demand Delivery"; Scientific Atlanta; Jun. 30, 2002; XP002524543; Retrieved from the Internet: URL:http://www.scientificatlanta.com/customers/source/7000183.pdf; whole document.

(Continued)

*Primary Examiner* — Mark D Featherstone
*Assistant Examiner* — Akshay Doshi

(57) ABSTRACT

A method and system for controlling a group of user receiving devices includes a local headend in communication with the group of user receiving devices through a local network. A management control system of the local headend generates a control signal and simultaneously communicates the control signal to the group of user receiving devices through the local network. The group of user receiving devices is controlled in response to the control signal.

47 Claims, 24 Drawing Sheets

(56) References Cited

U.S. PATENT DOCUMENTS

| | | |
|---|---|---|
| 2003/0140345 A1 | 7/2003 | Fisk et al. |
| 2004/0006772 A1 | 1/2004 | Ansari et al. |
| 2004/0117838 A1 | 6/2004 | Karaoguz et al. |
| 2004/0133911 A1* | 7/2004 | Russ et al. ............ 725/69 |
| 2004/0172658 A1 | 9/2004 | Rakib et al. |
| 2004/0250273 A1 | 12/2004 | Swix et al. |
| 2004/0250282 A1* | 12/2004 | Bankers et al. ............ 725/58 |
| 2004/0252243 A1 | 12/2004 | Stewart |
| 2005/0028206 A1 | 2/2005 | Cameron et al. |
| 2005/0028208 A1* | 2/2005 | Ellis et al. ............ 725/58 |
| 2005/0216937 A1 | 9/2005 | Shintani et al. |
| 2005/0283791 A1* | 12/2005 | McCarthy et al. ............ 725/1 |
| 2006/0041925 A1 | 2/2006 | Suh |
| 2006/0095945 A1* | 5/2006 | Carpenter et al. ............ 725/87 |
| 2006/0126551 A1 | 6/2006 | Delaunay et al. |
| 2006/0156357 A1 | 7/2006 | Lockridge et al. |
| 2006/0271954 A1 | 11/2006 | Lankford et al. |
| 2007/0033621 A1 | 2/2007 | Roeck |
| 2007/0039027 A1* | 2/2007 | Zeyher et al. ............ 725/74 |
| 2007/0074240 A1* | 3/2007 | Addington et al. ............ 725/25 |
| 2007/0101398 A1 | 5/2007 | Islam |
| 2007/0107019 A1 | 5/2007 | Romano et al. |
| 2007/0115933 A1 | 5/2007 | Muhamed et al. |
| 2007/0164609 A1 | 7/2007 | Shalam et al. |
| 2007/0266414 A1 | 11/2007 | Kahn et al. |
| 2008/0022322 A1 | 1/2008 | Grannan et al. |
| 2008/0040758 A1 | 2/2008 | Beetcher et al. |
| 2008/0066095 A1 | 3/2008 | Reinoso |
| 2008/0109854 A1 | 5/2008 | Casavant et al. |
| 2008/0120675 A1 | 5/2008 | Morad et al. |
| 2008/0127277 A1 | 5/2008 | Kuschak |
| 2008/0134249 A1 | 6/2008 | Yang et al. |
| 2008/0301748 A1 | 12/2008 | Lida et al. |
| 2009/0070817 A1* | 3/2009 | Ellis et al. ............ 725/46 |
| 2009/0081947 A1 | 3/2009 | Margis |
| 2009/0141735 A1 | 6/2009 | Kolhi |
| 2009/0278992 A1 | 11/2009 | Gutknecht et al. |
| 2009/0320055 A1 | 12/2009 | Langille et al. |
| 2009/0320058 A1 | 12/2009 | Wehmeyer et al. |
| 2010/0111504 A1 | 5/2010 | Yu et al. |
| 2010/0251315 A1 | 9/2010 | Ohmae |
| 2010/0251316 A1 | 9/2010 | Nicol et al. |
| 2011/0099575 A1* | 4/2011 | Woo et al. ............ 725/33 |
| 2011/0131603 A1 | 6/2011 | Dai |
| 2011/0131611 A1 | 6/2011 | Jaffery |
| 2011/0239251 A1 | 9/2011 | Miller |
| 2011/0239258 A1* | 9/2011 | Fisk et al. ............ 725/81 |
| 2011/0314492 A1* | 12/2011 | Cassidy et al. ............ 725/30 |
| 2012/0240168 A1* | 9/2012 | White et al. ............ 725/68 |
| 2012/0324510 A1* | 12/2012 | Leley et al. ............ 725/50 |

OTHER PUBLICATIONS

Anonymous; "ANGA Sees European Launch of RGB Networks USM—The Cable Industry's Highest Density QAM Modulator"; IPTV Industry; [Online] May 22, 2007; XP002524087; Retrieved from the Internet: URL: http://www.iptv-industry.com/pr/6d.htm; whole document.

* cited by examiner

DIRECTV Receiver Management System

Commands: Check-In | Check-Out | Reset Defaults

Administrator Settings · View Logs · Log Out

| Room | RID | CAM | IP | Favorite List | Active |
|---|---|---|---|---|---|
| ☐ All | | | | | |
| ☐ Unassigned | | | | | |
| ☐ Floor 01 | | | | | |
| ☐ Room 1-01 | 0354-1063-0830 | 0000-0000-0000 | 192.168.1.121 | — | Yes |
| ☐ Room 1-02 | 0354-1028-0222 | 0000-0000-0000 | 192.168.1.110 | — | Yes |
| ☐ Room 1-03 | 0354-6776-2973 | 0000-0000-0000 | 192.168.1.106 | — | Yes |
| ☐ Room 1-04 | 0354-1003-2557 | 0000-0000-0000 | 192.168.1.102 | — | Yes |
| ☐ Room 1-05 | 0354-6797-0774 | 0000-0000-0000 | 192.168.1.113 | — | Yes |
| ☐ Room 1-06 | 0354-1028-0909 | 0000-0000-0000 | 192.168.1.115 | — | Yes |
| ☐ Room 1-07 | 0354-1061-4123 | 0000-0000-0000 | 192.168.1.112 | — | Yes |
| ☐ Room 1-08 | 0354-1062-1102 | 0000-0000-0000 | 192.168.1.117 | — | Yes |
| ☐ Room 1-09 | 0354-1025-8301 | 0000-0000-0000 | 192.168.1.111 | — | Yes |
| ☐ Room 1-10 | 0354-1058-1603 | 0000-0000-0000 | 192.168.1.114 | — | Yes |
| ☐ Room 1-11 | 0354-1029-1039 | 0000-0000-0000 | 192.168.1.119 | — | Yes |
| ☐ Room 1-12 | 0354-6799-3297 | 0000-0000-0000 | 192.168.1.120 | — | Yes |
| ☐ Room 1-13 | 0354-1075-7377 | 0000-0000-0000 | 192.168.1.200 | — | Yes |
| ☐ Room 1-14 | 0354-1056-9590 | 0000-0000-0000 | 192.168.1.116 | — | Yes |
| ☐ Room 1-15 | 0354-1032-3584 | 0000-0000-0000 | 192.168.1.118 | — | Yes |
| ☐ Room 1-16 | 0354-6800-6925 | 0000-0000-0000 | 192.168.1.100 | — | Yes |
| ☐ Floor 02 | | | | | |
| ☐ Room 2-01 | 0354-1063-0830 | 0000-0000-0000 | 192.168.1.104 | — | Yes |
| ☐ Room 2-02 | 0354-1063-0830 | 0000-0000-0000 | 192.168.1.105 | — | Yes |
| ☐ Room 2-03 | 0354-1063-0830 | 0000-0000-0000 | 192.168.1.107 | — | Yes |
| ☐ Room 2-04 | 0354-1063-0830 | 0000-0000-0000 | 192.168.1.108 | — | Yes |

FIG. 4

| Channel | Network | 8:00 p.m. | 9:00 p.m. |
|---|---|---|---|
| 7 | ABC | Movie | |
| 8 | Hotel Information | | |
| 9 | Society Of Engineers Conference Video | | |
| 10 | CBS | Survivor | |

FIG. 16

METHOD AND SYSTEM FOR
CONTROLLING USER DEVICES IN AN
AGGREGATED CONTENT DISTRIBUTION
SYSTEM

TECHNICAL FIELD

The present disclosure relates generally to television distribution systems and, more particularly, to a local system that allows user receiving devices to be individually controlled or controlled in groups.

BACKGROUND

Satellite television has become increasingly popular due to the wide variety of programming available and the quality of service. Hotel systems may offer various types of programming from cable systems or satellite systems to guests. Often times, the systems are provided without program guides or other amenities typically found in a home viewing experience.

Hotel or other property owners often provide information to guests using the video distribution system. Content provided to guests through the video distribution system may be referred to as local content channels. Hotel systems often do not provide convenient systems for hotel operations to change local content or provide guest means for easily accessing content.

SUMMARY OF THE DISCLOSURE

The present disclosure allows multiple user devices in a system to be individually controlled or controlled in groups by the head end.

In one aspect of the disclosure, a method includes generating a control signal at a management control system of a local headend, simultaneously communicating the control signal to a group of user receiving devices through a local network and controlling the group of user receiving devices in response to the control signal.

In another aspect of the disclosure, a system for controlling a group of user receiving devices includes a local headend in communication with the group of user receiving devices through a local network. A management control system of the local headend generates a control signal and simultaneously communicates the control signal to the group of user receiving devices through the local network. The group of user receiving devices is controlled in response to the control signal.

In yet another aspect of the disclosure, a method comprises generating a control signal at a management control system of a local headend, communicating the control signal to a user receiving device, said user receiving device comprising user adjusted settings and controlling the user receiving device in response to the control signal to reset the user adjusted settings at the user receiving device.

In still another aspect of the disclosure, a system includes a local headend, a user receiving device in communication with the headend and a management control system disposed within the local headend generating a control signal. The management control system communicates the control signal to the user receiving device having user adjusted settings. The user adjusted settings are reset in response to the control signal.

Other features of the present disclosure will become apparent when viewed in light of the detailed description of the preferred embodiment when taken in conjunction with the attached drawings and appended claims.

BRIEF DESCRIPTION OF THE DRAWINGS

FIG. 4 is a screen display of the receiver management system illustrating the various parameters for the devices.

FIG. 16 is a screen display illustrating local content insertion in a program guide.

DETAILED DESCRIPTION

Figure 1:
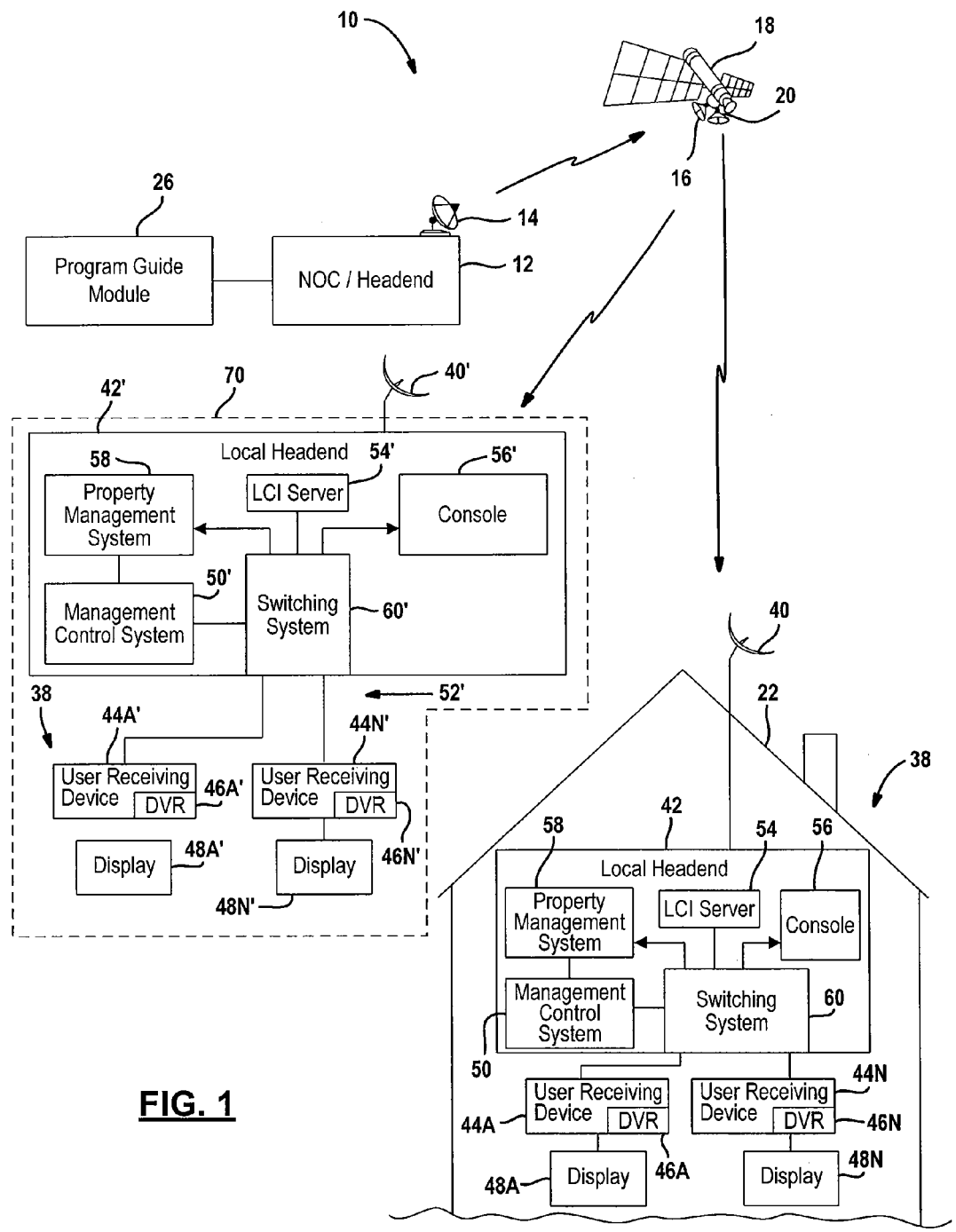
FIG. 1 is a block diagrammatic view of a content distribution system according to the present disclosure.

In the following figures the same reference numerals will be used for the same views. The following figures are described with respect to a satellite television system. However, those skilled in the art will recognize that the teachings of the present disclosure may be applied to various types of systems including a cable system or wireless terrestrial systems.

As used herein, the term module refers to an Application Specific Integrated Circuit (ASIC), an electronic circuit, a processor (shared, dedicated, or group) and memory that executes one or more software or firmware programs, a combinational logic circuit, and/or other suitable components that provide the described functionality. As used herein, the phrase or at least one of A, B, and C should be construed to mean a logical (A or B or C), using a non-exclusive logical OR. It should be understood that steps within a method may be executed in different order without altering the principles of the present disclosure.

Referring now to FIG. 1, a satellite television broadcasting system 10 is illustrated. The satellite television broadcasting system 10 includes an operational headend or network operations center (NOC) 12 that generates wireless uplink signals through a transmitting antenna 14 which are received by a receiving antenna 16 of a satellite 18. The wireless signals, for example, may be digital and in a first format used for satellite communications. A transmitting antenna 20 generates wireless downlink signals directed to various receiving systems including stationary systems such as those in a building 22 or property with multiple buildings. The building 22 may be a larger home, a multiple dwelling units, hotel or other types of commercial buildings in which having multiple screen displays coupled to a local server are desirable.

The wireless signals may have various types of data associated with them including various channel information such as a channel or program guide, metadata, location information and the like. A television channel communicated from outside the building or property will be referred to as an external channel. The guide data corresponding to the external channel is referred to as external guide data. Both the external guide data and external channel data may be received from the network operations center 12 or external headend. The wireless signals may also have various video and audio signals associated therewith. The wireless signals may also include program guide data from a program guide module 26. The program guide module 26 may communicate various objects to the network operations center 12. Various types of data may be communicated about the programming and grid guide including the channel number, a network identifier, program data such as a start and end time of airing, title, numerical identifier, content data such as actors, descriptions, ratings and the like. Program guide data may include the relative positions of the data, the line structures for forming the grid for the program guide and the like.

Building 22 includes an aggregated content distribution system 38 for distributing both local content and external content. The aggregated content distribution system 38 includes a receiving antenna 40 that receives the wireless signals from the satellite 18 and processes the signals in a local headend 42. The local headend 42 is within the property or building 22. The local headend 42 is physically separated from the external headend 12 by some transmission medium such as the satellite, cable or another wired or wireless network. Although only one antenna 40 is illustrated more antennas may be provided. The local headend 42 provides communication signals to a plurality of user receiving devices 44A-44N. The plurality of user receiving devices 44A-44N may be referred to as a set top box. In a hotel environment the set top box may be desired to be hidden from view. In such a situation, the set top box may be hidden behind the television and out of sight of the customers. Such a box may be referred to as a setback box. With the exception of the pass through signals described below, the setback box and set top box may be functionally equivalent. Unless otherwise stated, the term user receiving device is interchangeable with a set top box unless otherwise stated.

Each user receiving device 44A-44N may include a digital video recorder (DVR) 46A-46N. The digital video recorders 46A-46N may include a user partition and a network partition. This is illustrated below. The user partition is memory space that is set aside for the use of recording programming thereon. The network partition may include various controls, guide data and other data that may be provided to the set top box that is not under the control of the user or customer. As will be described below, the user partition may be reset or erased when a customer checks out from the building when the building is a hotel. Parental controls may also be erased or reset. Parental controls allow content above a rating to be restricted or not viewed at the user receiving device.

The plurality of user receiving devices 44A-44N receives signals from the local headend 42 and controls a respective display device 48A-48N in response to thereto. The display devices 48A-48N may include either an audio or a video display, or both. The display devices 48A-48N may be monitors or television displays. The display devices 48A-48N are individually controlled by their respective user receiving devices 44A-44N.

As was mentioned above, the system 38 may also apply to a cable-based or terrestrial wireless system. In such a case, the antenna 40 would be replaced with a cable connection or terrestrial antenna. The system 38 may also be used in a terrestrial broadcast system. In such a case, the satellite antenna 40 would be replaced by a terrestrial signal receiving antenna.

The local headend 42 includes a management control system 50 that performs many functions. The management control system 50 maintains a database with all of the user receiving devices 44A-44N in a local network 52 in communication with the local headend 42. The management control system 50 also provides a server-based web application to manage the user receiving devices within the local network 52.

The local headend 42 may also include a local content insertion server 54 that provides and manages the local content files, the generation of channel information, the sending of channel information to the user receiving devices 44A-44N and multicasting the local content.

A console 56 may also be included within the local headend 42. The console 56 may be a web-based computer that can access the various server applications provided within the local headend 42.

A property management system 58 may also be included within the local headend 42. The property management system 58 manages various functions including check-ins and check-outs. Also, accounting, bookkeeping, occupancy reports and the like may also be provided from the property management system 58. The property management system 58 may interface with various systems to perform functions such as pay-per-view retrieval, hotel headend status of room use and the like. The property management system 58 and the management control system 50 may be in direct communication. Further, each of the components 50-58 may also be in communication with a switching system 60. The switching system 60 may act as a routing system between the various components of the local headend and between the various components of the local headend 42 and the user receiving devices 44A-44N. The switching system 60 is illustrated as within the headend 42. However, the switching system may be at least partially outside the headend. The various functions of the components within the local headend 42 will be described in detail below.

An aggregated content distribution system 38' may also be disposed within a vehicle 70. The system 38' may also include an antenna 40', local headend 42' and a plurality of user receiving devices 44A'-44N' coupled to the local headend 42' through a network 52'. The vehicle 70 may be different types of vehicles including an airplane, ship, train, bus, van or automobile. Each of the user receiving devices 44A'-44N' may be coupled to a respective display device 48A'-48N'. As described above, each of the user receiving devices 44A'-44N' may also include a digital video recorder 46A'-46N', respectively. Also, the components of the local headend (50'-60') may also be similarly disposed for controlling and providing content to the various user receiving devices 44A'-44N'.

Figure 2:
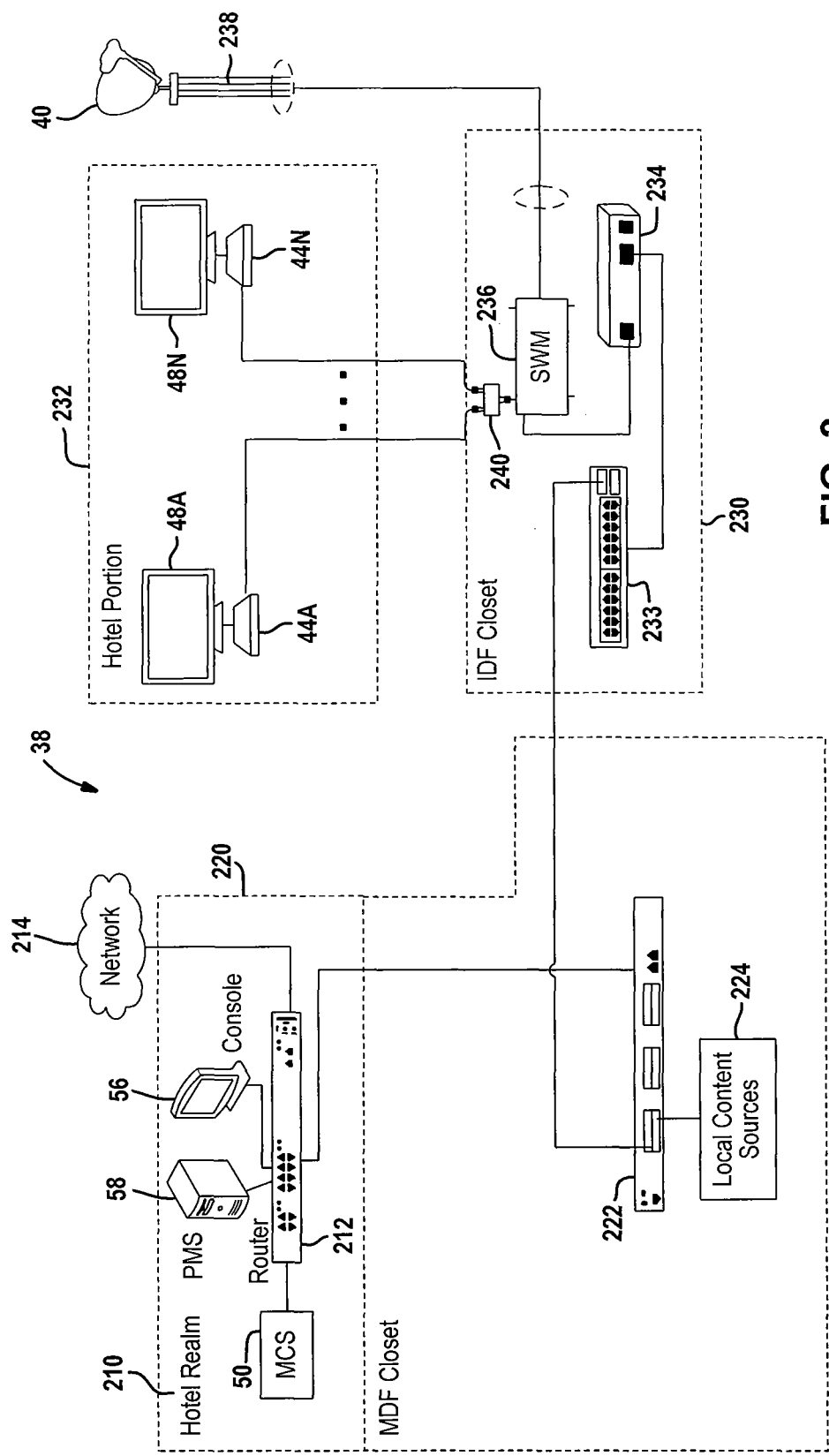
FIG. 2 is a simplified block diagrammatic view of a local content distribution system.

Referring now to FIG. 2, one example of the aggregated content distribution system 38 is set forth for distributing local content as well as external content received from the external headend 12. The local content distribution system 38 is illustrated segmented into different functional areas. In this example, a hotel control portion 210 includes a router 212, the console 56 and a property management system 58. The management control system 50 may also be in communication with the router 212. The router 212 may be part of the switching system 60 illustrated in FIG. 1. The router 212 may also be in communication with a network 214 for receiving and transmitting various data.

A main distribution facility (MDF) 220 may also be part of the aggregated content distribution system 38. The main distribution facility 220 may be in communication with and physically separated from the hotel control portion 210. The main distribution facility 220 may be located in a closet or room, for example, in a basement or in an out-of-the-way location. The main distribution facility 220 may include a main distribution facility switch 222. The main distribution facility switch 222 may also be in communication with local content sources 224. The local content sources 224 will be described below as different means for providing local content signals to the remaining portions of the system.

The aggregated content distribution facility 38 may also include an intermediate distribution facility (IDF) 230. The intermediate distribution facility 230 communicates the content to various user receiving devices such as user receiving devices 44A-44N located within hotel rooms 232. The intermediate distribution facility 230 may be located on each floor of the hotel or adjacent to the plurality of hotel rooms in which it serves. For larger systems 38 one main distribution facility 220 and a plurality of intermediate distribution facilities 230 may be used. The intermediate distribution facility 230 may include an intermediate distribution facility switch 233 which communicates signals to a format conversion module 234. The format conversion module 234 is used to convert internet protocol (IP) signals to a coaxial format. In this example, the conversion module 234 may be a DIRECTV® Ethernet coaxial adapter (DECA). The conversion module 234 is an IP-to-coaxial converter. The conversion module 234 is in communication with a single wire multi-switch or switch module (SWM) which is referred to as a switch module 236. The switch module 236 may also be in communication with the antenna 40. In this embodiment, four outputs 238 are received from the antenna and communicated to the switch module 236. A splitter 240 may be used to split the output of the switch module 236 to communicate the content signals and guide data signals to the various hotel rooms 232.

Figure 3:
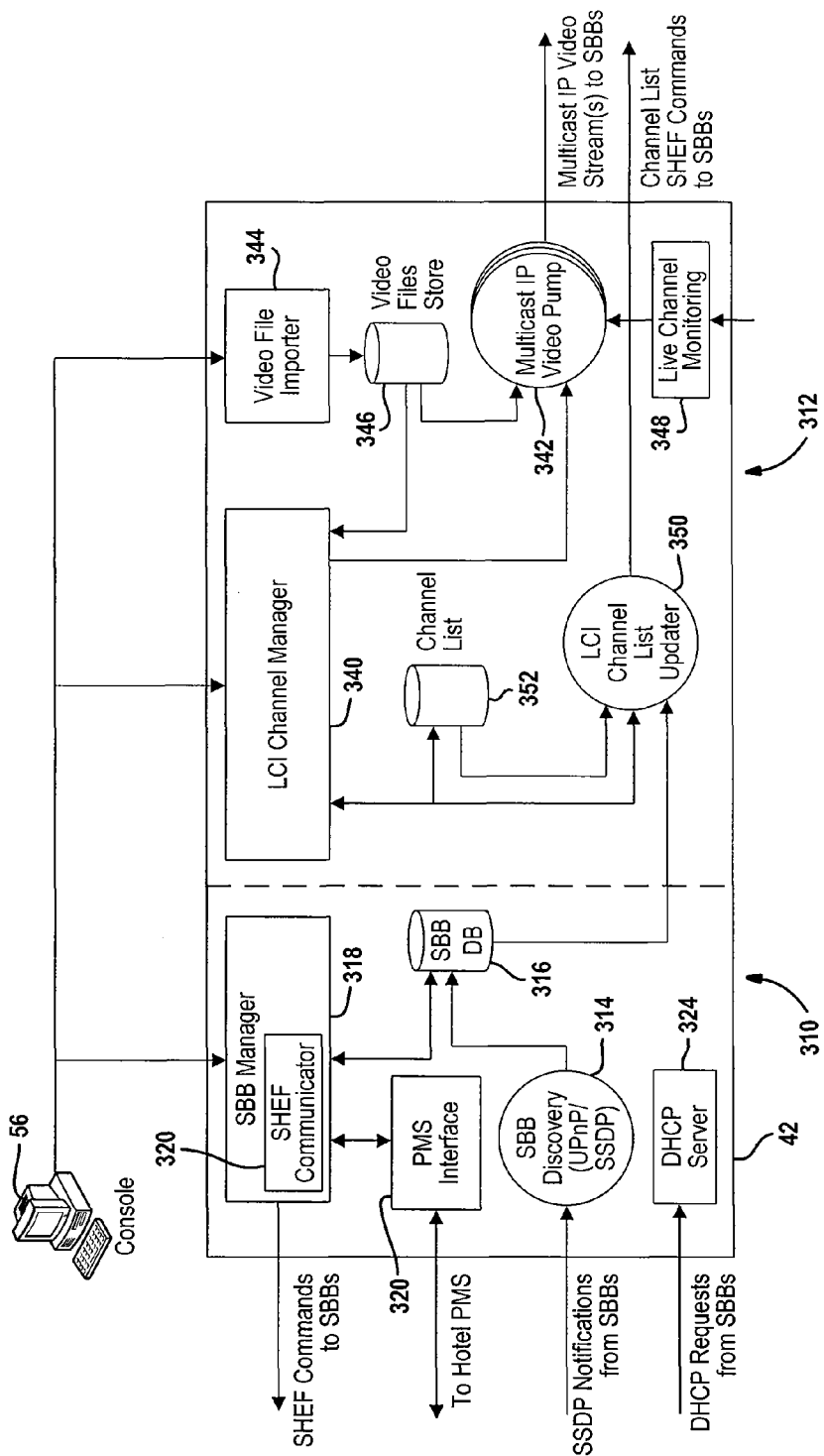
FIG. 3 is a block diagrammatic representation of the flow of content in the local headend.

Referring now to FIG. 3, the local headend 42 is illustrated in functional blocks that may be implemented in hardware, software or a combination of both. The local headend 42 has two main functions including user receiving device functions 310 and local content insertion functions 312. The user receiving device functions 310 will be described as setback box functions but apply equally to various types of user receiving devices including a set top box.

The user receiving device functions 310 include a setback box discovery service 314. The setback box discovery service 314 initiates a service that listens to the local network to discover all the setback boxes on the network. The service may be implemented using different protocols including universal plug-and-play (UPnP) and simple service discovery protocol (SSDP). Upon discovery of a new setback box, the discovery service 314 reads identification data such as the IP address, the receiver identifier and the conditional access module information. Also, other types of data may be received by the setback box discovery device including the signal quality, the current setback box time, and low battery status. This data is stored within the setback box database 316. Each setback box may periodically notify the network of its presence. An "alive" status may also be communicated regularly by the setback boxes throughout the network. The setback box discovery service 314 receives the data which may be used by the setback box manager 318 to display availability information to the system operator.

The setback box database 316 contains lists for all discovered user receiving devices (setback boxes), a running status of the user receiving devices, a favorites list for each user receiving device and group data for the system.

The setback box manager 318 may include a set top box (STB) hypertext transfer protocol (HTTP) exported functionality (SHEF) communicator 320. The HTTP commands from the SHEF communicator 320 and as control commands to command the various user devices to perform different functions. The SHEF communicator 320 is a service that the setback box manager 318 uses to generate appropriate SHEF commands. The SHEF communicator 320 is capable of simultaneously communicating with a group or sub-group of setback boxes in order to quickly and efficiently send and receive data from a large number of setback boxes. The groups or sub-groups may be selected at the console 56 of the local headend.

The SHEF communicator 320 may use a SHEF encryption key to communicate with each setback box in the system. It should be noted that although one SHEF communicator 320 is illustrated, different numbers of physical machines may be used to run the function of the SHEF communicator 320. The number of physical machines is dependent upon the number of user devices. The SHEF communicator 320 initiates connections and prevents a second command from being sent to a setback box before a first command completes.

The setback box manager 318 allows the property management user to configure, manage and view the status of the various setback boxes within the system 38. This is performed using the console 56 illustrated in FIG. 3. All of the setback boxes for the system may be displayed at the console 56 with various data including a name, an IP address, a receiver ID, a status, whether or not the system is active, and the like. The display may also be organized by floors or other designated groups. Thus, different groups of setback boxes may be controlled in a different manner. The setback boxes may have access to different content or local channels as will be further described below. The setback box manager 318 may be used to set room numbers, reboot the setback boxes, display on-screen displays for a particular setback box or a group of setback boxes, and define, apply and reset default settings. The setback box manager 318 may also be used to define, manage and set favorites lists, receive visual or audio alerts regarding setback box changes from active to non-active, configure various screen alerts and the like.

Referring now to FIG. 4, a screen display illustrating a DIRECTV® receiver management system is set forth. As described above, the setback box manager 318 may display various data on a display 410. The display may include a room number column 412, a receiver identification number column 414, a conditional access module number column 416, internet protocol identifier column 418, a favorites list column 420, and an active indicator column 422. As is illustrated in column 412, various "floors" of equipment may also be sorted. The floors include groupings of systems such as those organized by intermediate distribution facilities. The floors could represent one group or different group of devices. As mentioned above, when various video and/or audio alerts may be generated by the receiver management system such as when a receiver changes from an active to inactive mode. Audible displays may also be activated such as beeping to provide an indicator of a change of status of one of the receiver identifiers.

The favorites list 420 may be configured by the setback box manager to allow each of the setback boxes to be configured with a favorites list. The favorites list determines the list of channels viewable by the guest in the room. Multiple favorites lists may be pre-configured and may be referred to by name and selected for a different room. Thus, different favorites lists may be configured for each room. Groups of rooms may also be configured with the same favorites list.

Referring back to FIG. 3, the setback box manager 318 may also provide other functions including grouping of setback boxes into groups which is shown in FIG. 4. This may be performed based upon room number. Groups may be assigned by selection for special groups or sub-groups at the facility. For example, when a conference is at a hotel, setback boxes for the rooms assigned to the attendees of the conference may be selected together. By selecting the group, local content channels may be accessed by only the attendees of the conference. For example, various lectures may be telecast through the local property. Another use is a concierge floor of a hotel which may allow access to more channels than a general guest. The groupings may thus be assigned by floor.

The user receiving device functions 310 may also include a dynamic host configuration protocol (DHCP) server 324. The DHCP server 324 may be used to receive requests from setback boxes using the dynamic host configuration protocol.

A property management system (PMS) interface 328 may also be included within a user receiving device functions 310. The PMS interface 328 allows the setback box manager 318 to communicate with the property management system 58 illustrated in FIG. 1. The property management system 58 may send events like check-in or check-out. One purpose of the PMS interface 328 is to interface with an existing Property Management System with the local head-end. The PMS may initiate resetting the defaults of the setback boxes in the rooms when a guest checks in or out by interfacing with the local head-end and sending these commands. A check-out or check-in message may be received from the property management system which may then be communicated to the management control system 50. The PMS interface 320 is in communication with the setback box manager 318 which generates the appropriate communication signal such as the SHEF commands which are communicated to the setback boxes.

The local content insertion functions 312 are used for generating program guide channel objects for the local content channels inserted at the local headend. The channel objects provide the setback boxes with enough data to create an entry in the program guide in the setback box. The channel objects also provide enough data to allow the setback boxes to tune to the proper local channel. It should be noted that a standard program guide may be received in various manners from the satellite. The channel objects for the local channels may be referred to as a local channel insertion channel object. The program guide is thus modified from a standard program guide for the local content distribution system.

The local content insertion functions 312 include a local content insertion (LCI) channel manager 340. The local content insertion channel manager 340 is used to define the channels that are communicated via a server-based web application. Local content is distributed via a multicast stream having a multicast address on an IP network. Each multicast stream is defined by a channel which will appear in the setback box guide. Tuning data for the multicast stream is included in the program guide to allow the user devices to tune to the channel.

The local content insertion functions 312 are used to manage the list of all available channels of local content using the local content insertion channel manager 340. The local content insertion channel functions 312 may also provide the ability to stream out any locally stored video files via a multicast IP stream using a multicast IP video pump 342.

A video file importer 344 may be used to import files via a file transfer protocol or USB. The video file importer 344 stores files in a video files store 346. The video file importer 344 imports content that is stored or prerecorded. The local content insertion functions 312 may also import live channels. A live channel monitoring system 348 may be provided prior to the multicast IP video pump 342. Live channels may be communicated to the multicast IP video pump 342 from the live channel monitoring system 348. The live channel monitoring system 348 may allow a check to be performed on the live channel so that "bad" content may not be distributed to the setback boxes. Live channel monitoring may include monitoring bitstreams for the live channels for validation. Checks may be a simple MPEG-2 transport packet synchbyte verification or looking for the presence of a particular bitstream. Of course, other types of monitoring, depending on the type of signal, may be performed.

A local content insertion channel list updater 350 may be used to update a channel list 352 in response to the local content insertion channel manager 340. The local content insertion channel manager 340 may initiate an additional channel (channel insertion) or remove a local content insertion channel from the system (channel deletion). The local content insertion channel list updater 350 generated an insertion or deletion signal to update the channel list to add or remove a channel and direct the system to the proper content within the file store 346 or the live channels from the live channel monitoring system 348. These operations may be performed through the console 56.

Figure 5:
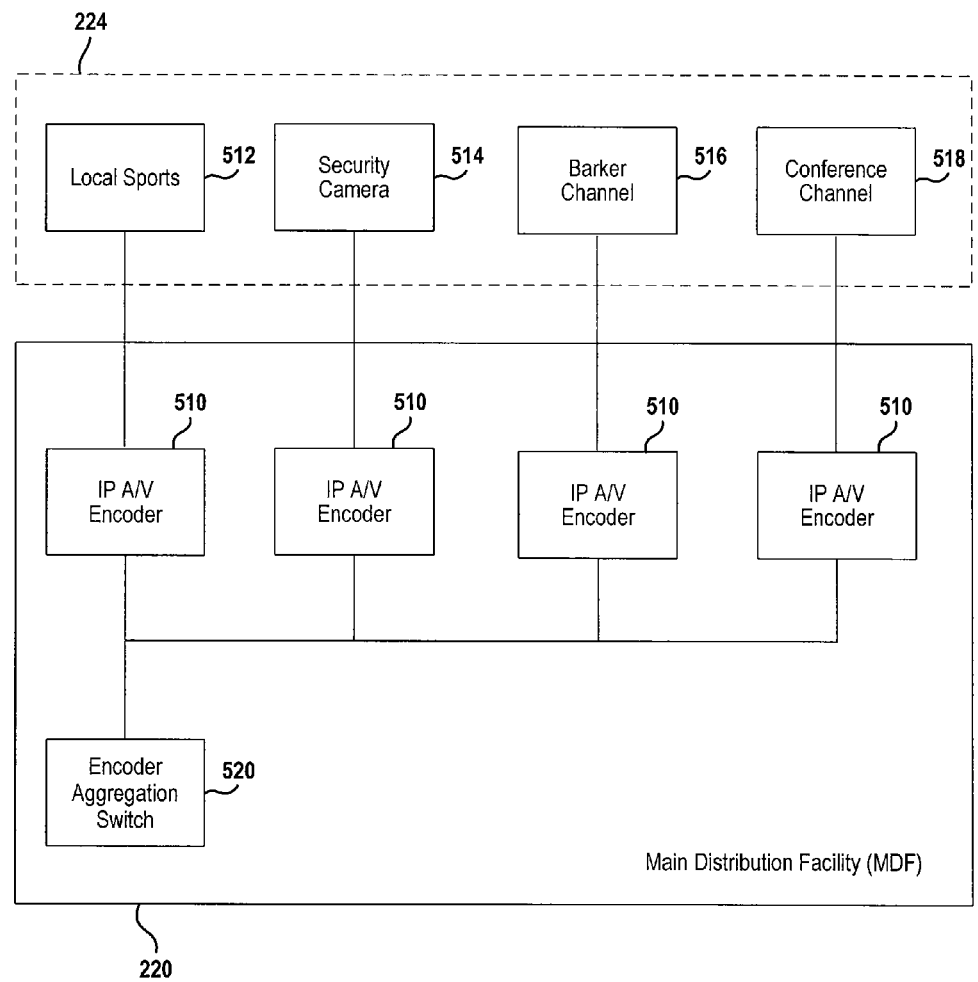
FIG. 5 is a block diagrammatic view of a main distribution facility.

Referring now to FIG. 5, the main distribution facility 220 is illustrated in further detail. As mentioned above, the local content sources 224 may be generated from various live sources or recorded sources. The main distribution facility 220 may include a plurality of encoders such as an IP audio-video (A/V) encoder 510. Each of the local content sources 224 may include a respective encoder in the main distribution facility 200. A local sports module 512 receives live or recorded local sporting channels and communicates the local sporting channels to a respective encoder 510. The local sports module 512 may be a local over-the-air antenna, cable feed or satellite feed.

Another type of local content sources 224 is a security camera 514. The security camera 514 may generate an output which is communicated to a respective encoder 510. Of course, the security camera may generate a formatted signal that requires no further encoding is necessary. Various numbers of security cameras 514 may be incorporated into a system.

A barker channel module 516 may generate a barker channel signal which is communicated to an encoder 510. The barker channel 516 is a form of digital signage. The barker channel may be composed of different sales promotions, advertising for various services within the local network and various announcements. The barker channel 516 may include recorded content as well as directions for various events. The content may be as simple as text. Of course, different slides or screens may be provided on a periodic basis and "revolve" to provide different types of announcements or screen displays. This may be managed through the console 56 and the management control system 50 illustrated in FIG. 1.

A conference channel module 518 may be used to generate live or recorded conference material for the aggregated content distribution system 38. The conference module 518 may be communicated to an encoder 510. The conference signal from the conference channel module 518 may be provided selectively to guests participating in the conference.

Each of the encoders 510 may be in communication with an encoder aggregation switch 520. The encoder aggregation switch 520 aggregates or receives all the encoder signals from the encoders for each of the local content sources 224. The encoder aggregation switch 520 may be in communication with the main distribution facility switch 222. The content from the local content sources 224 is provided to the hotel rooms through the encoder aggregation switch 520 and other switching means provided within the content distribution system.

Figure 6:
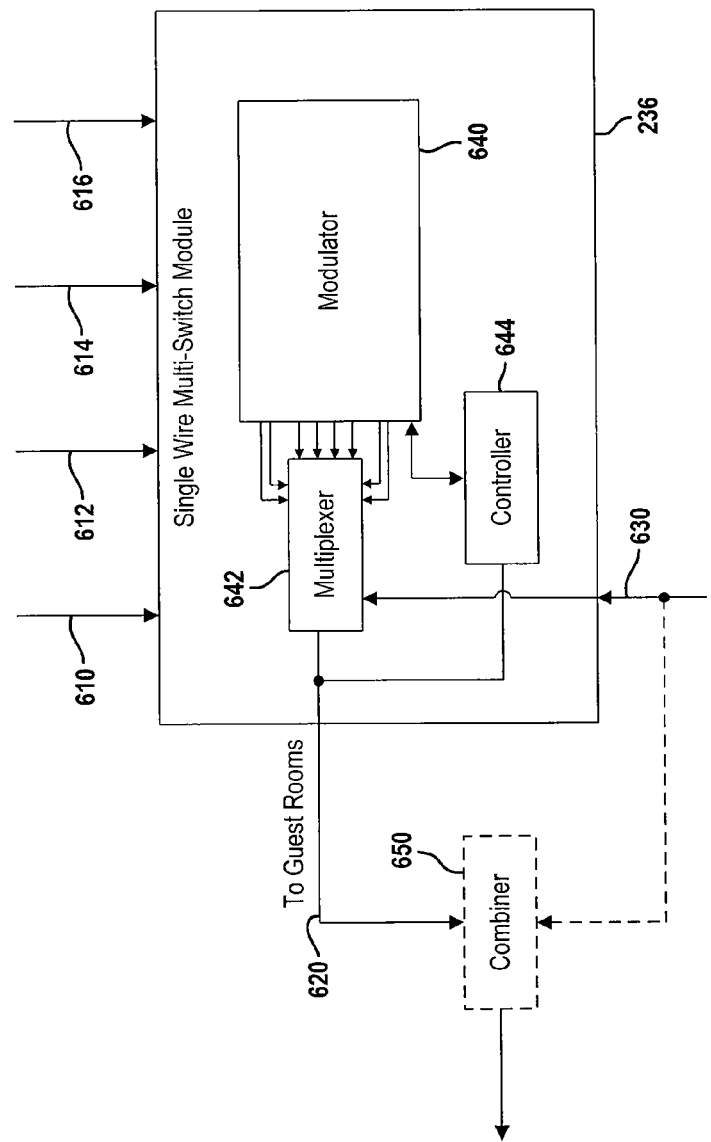
FIG. 6 is a simplified block diagrammatic view of a single-wire multi-switch module.

Referring now to FIG. 6, a single-wire multi-switch module (switch module) 236 is illustrated in further detail. In this embodiment, four inputs 610, 612, 614, and 616 are illustrated. The single-wire multi-switch module 236 may also include an output 620 used for generating output that is communicated to the various rooms. In this example, eight guest rooms may be fed from a single output 620. A splitter may be used to split the output physically.

The inputs 610-616 may receive external channel signals having various frequencies corresponding to the transponders of the satellite. Thus, the inputs 610-616 may have frequencies stacked that correspond to the frequencies of the transponders within the satellite. The inputs include frequencies that correspond to program guide data.

The single-wire multi-switch module 236 may also include an auxiliary input 630.

The inputs 610-616 correspond to the transponders for the different orbital locations of the satellite. The single-wire multi-switch module 236 assigns a frequency for each of the tuner modules within the setback boxes. Thus, each of the tuner modules is assigned a different frequency band for communication. A modulator module 640 is used for providing the modulated signals. Each of the user receiving devices thus generates a request for a channel from one of the inputs 610-616. The channels are then modulated into the frequency corresponding to the tuner of the user receiving device. The frequency signals may be combined onto the output 620 using a multiplexer 642. The splitter 240 illustrated in FIG. 2 may split the combined signal for each tuner or user receiving device. Every tuner may receive every requested channel but only the channel (frequency) corresponding thereto is displayed. A controller 644 controls the communication and the modulators 640 to provide the proper signal. In this example, each guest room corresponds to a single user receiving device having one tuner. However, in a system that includes a digital video recorder, more than one tuner may be associated with a user receiving device. In this manner, each tuner may correspond to a different modulated frequency. In the present example, eight different tuner modules are assigned to a single-wire multi-switch module 236. However, various numbers of devices may be provided depending upon the size of the single-wire multi-switch module. Program guide data may be communicated through the inputs 610-616 or the auxiliary input 630. Also, local content channels may also be provided through the auxiliary input 630. Details of these configurations will be set forth below.

The auxiliary input 630 may be an IP local channel signal that was converted to coaxial format. The signal received on the auxiliary input 630 may also be modulated at a frequency different than the external channel signals received at the modulator 640. The output of the multiplexer 642 may include the modulated signals for the external channel signals and the modulated local channel signal received at the input 630.

In an alternative embodiment, a combiner 650 may receive the modulated local channel signal and combine the signal with the multiplexed and modulated external channel signals. The external channel signals and the modulated local channel signal in the coaxial format may be combined outside of this single wire multi-switch module 236. The signal on the auxiliary input 630 may be from the IP to coaxial conversion module (DECA) that will be described below in FIGS. 13, 14 and 15. The combiner and single wire multi-switch module 236 may be considered together to be a switch module. That is, whether the local channel insertion signals and the external channel signals are combined inside or outside the single wire multi-switch module, the switch module includes the single wire multi-switch module or the single wire multi-switch module 236 and the combiner 650.

Figure 7:
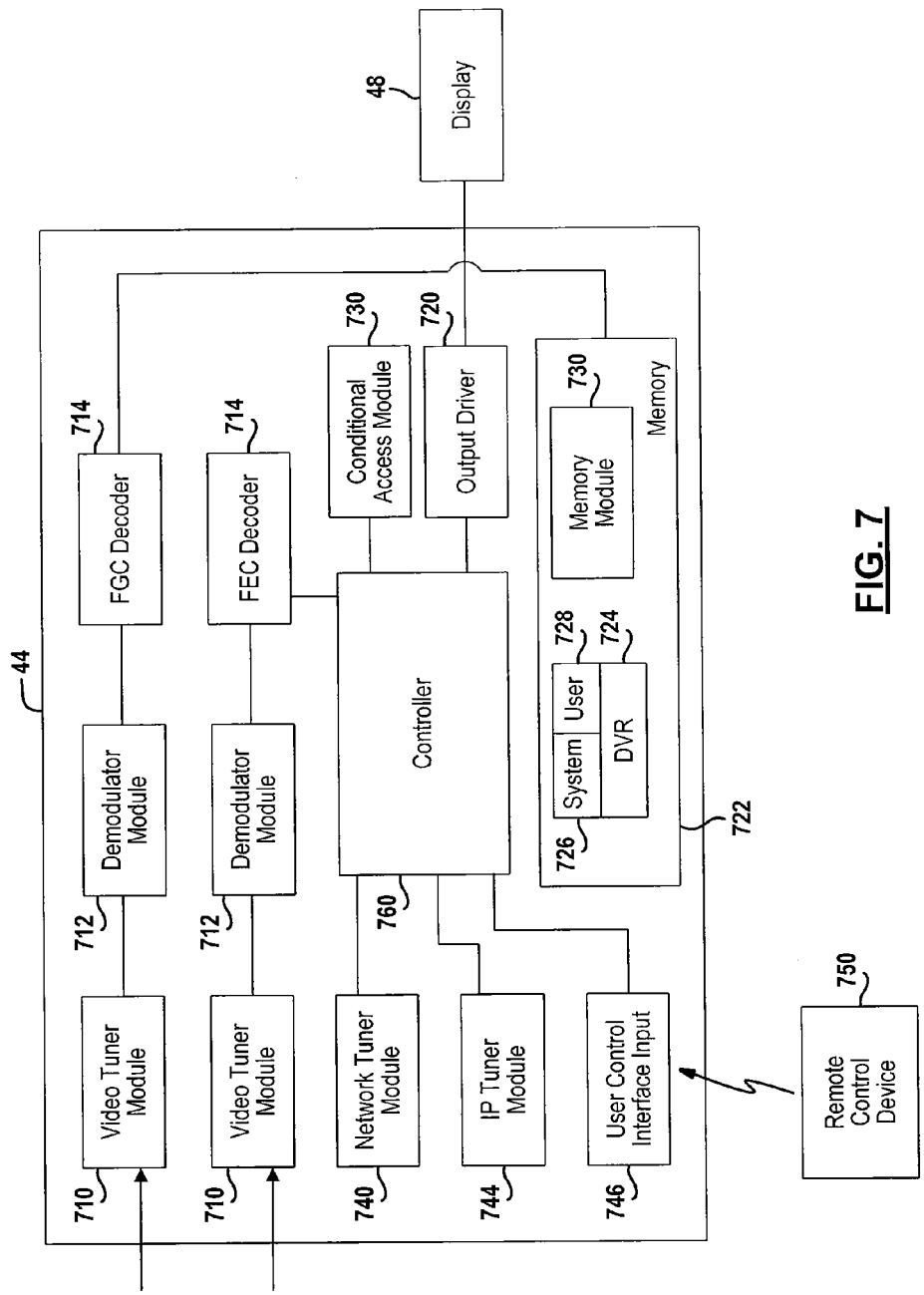
FIG. 7 is a block diagrammatic view of the user receiving device according to the present disclosure.

Referring now to FIG. 7, a user receiving device 44 is set forth in further detail. The user receiving device 44 may include one or more video tuner modules 710. The video tuner modules 710 may receive signals from the satellite antenna 40 through the single-wire multi-switch module 236 illustrated in FIG. 6. Each video tuner module 710 may be in communication with a demodulator module 712. The demodulator module 712 demodulates the tuned signal from the video tuner module and provides the output to a forward error correction decoder 714. The forward error correction decoder 714 may be provided to the display 48 through an output driver 720. Further, the output of one of the decoders 714 may be provided to a memory 722 which may include a DVR 724. As mentioned above, the DVR 724 may include a system partition 726 and a user partition 728. The content from the forward error correction decoder 714 may be stored in the user partition 728 for inter playback.

A conditional access module 730 may also be provided within the user receiving device. The conditional access module (CAM) 730 may include decryption keys for decrypting the content received. Without a conditional access module 730 signals may not be used by the user receiving device 44.

The memory 722 may also include a memory module 730 that comprises various types of memory used for operating the user receiving device. For example, the memory module 730 may include volatile memory and non-volatile memory. Non-volatile memory may include an EEPROM. The memory module 730 may be used for storing various operational values and program guide data and the like.

The user receiving device 44 may also include a network tuner module 740. The network tuner module 740 may be used to tune to an RF signal for receiving program guide data. The program guide data may be received from an external source such as the satellite or through the local headend and the local content insertion functions 312 illustrated in FIG. 3.

The user receiving device 44 may also include an IP tuner module 744. The IP tuner module 744 may be used to transmit and receive data through the local IP network associated with the content distribution system of the local headend.

The user receiving device 44 may also include a user control interface input 746. The user control interface input 746 may provide inputs from buttons or switches on a remote control device 750. For a setback box, the user control interface input 746 may be provided from the remote control device 750. For a set top box, the remote control device may communicate coded signals directly to the user control interface input using infrared or RF signals. The remote control device 750 may provide user control interface signals through a television for a user receiving device 44. This process will be further described below. The user control interface input 746 receives the coded signals from the remote control device and provides the coded signal to a controller 760. The controller 760 is a microprocessor-based system that controls the various components within the user receiving device 44. For example, the tuner module 710, the demodulator module 712, the decoder module 714, the conditional access module 730, the output driver 720, the memory 722 and the tuner modules 710 may all be associated or in communication with the controller 760. Based upon the various conditions, the controller 760 generates various outputs including displaying program guide data and content data as well as receiving and forming selections. The controller 760 also interfaces with the local headend 742 through the network tuner module 740 so that various functions may be controlled. Some functions have been described above and further functions will be described below.

It should be noted that the setback box or set top box embodied in the user receiving device 44 may not include all of the various components depending upon the configurations. For example, the number of tuner modules 710, demodulator module 712 and decoder 714. Further, the requirement for an IP tuner module 744 or network tuner module 740 may not exist in some configurations. Various configurations for different types of systems using different types of communication protocols may require different components.

Figure 8:
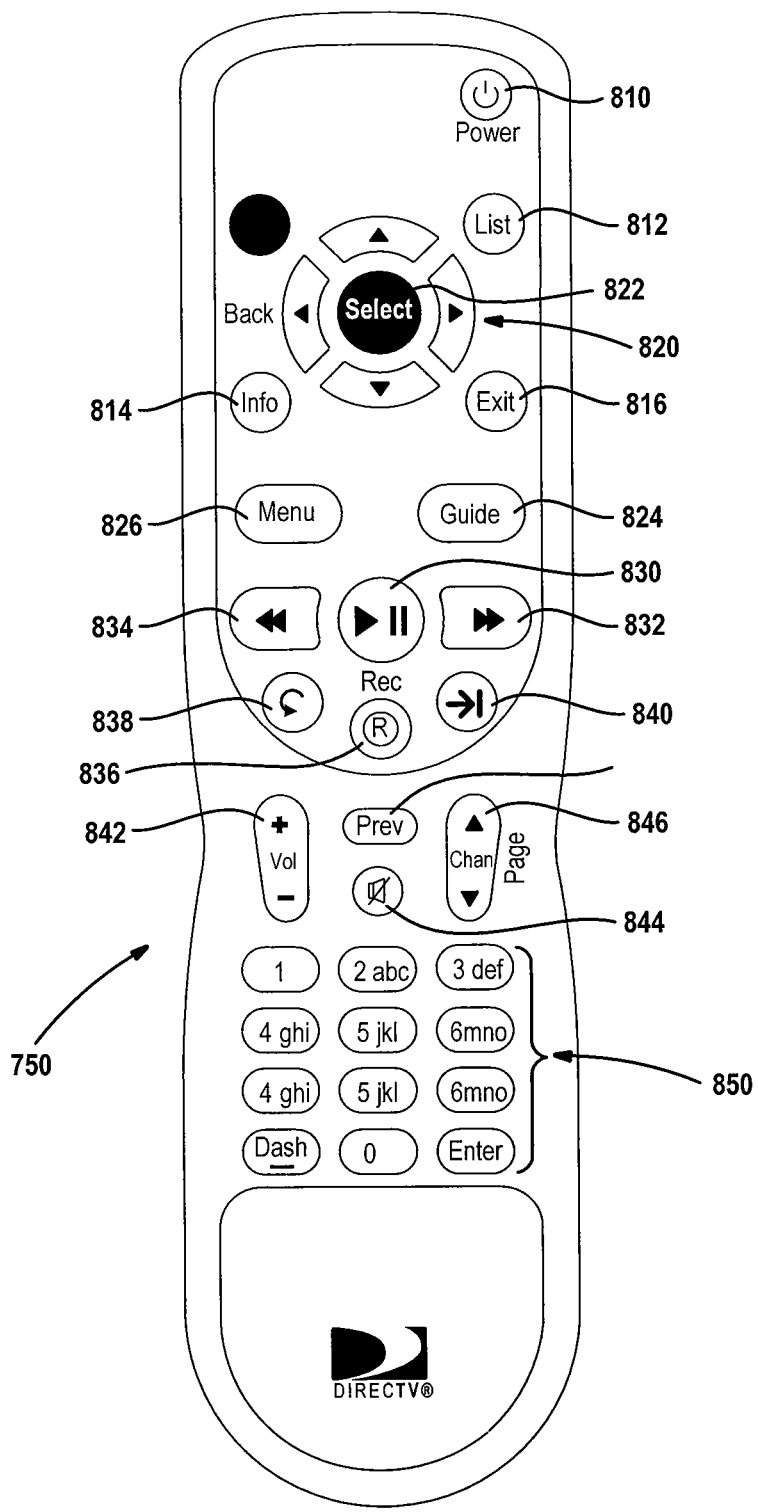
FIG. 8 is a plan view of a remote control device.

Referring now to FIG. 8, the remote control device 750 of FIG. 7 is illustrated in further detail. A power button 810 may be used to power the remote control device 750 or the television or both. With a setback box configuration, the user may not realize that the setback box is actually disposed behind the television out of view. Therefore, the power button 810 may be used to control both the television power or monitor power and the setback box power. The remote control device 750 may include a list button 812 for listing various functions associated with a menu system. An information button 814 may be used to provide various information in a menu system. An exit button 816 may also be provided for exiting a particular menu system. Various arrow keys 820 may be used for navigating different menu systems. A select button 822 may be provided for selecting various functions. A guide button 824 may be used for displaying a program guide. A menu button 826 may be used for obtaining a menu for controlling various functions.

Should the user receiving device include a digital video recorder, control buttons for controlling the digital video recorder may be provided. For example, a play or pause button 830 may be provided. As well, a forward button 832 and a reverse button 834 may also be provided. A record button 836 as well as repeat button 838 may also be provided. A forward button 840 may also be provided.

To control the volume of the display, a volume switch 842 may be provided. The volume switch 842 may be a rocker switch that increases or decreases the volume. A mute button 844 may be used to mute the sound from the television. A channel change button 846 may also be provided for changing the channels or selecting a different page in a menu structure. Number buttons 850 may also be provided. The number buttons 850 may allow the user to select a particular number for selecting a channel or providing an input to the recording device. Various alphabetic characters may also be associated with the number buttons. The alphabetic characters may be selected for providing various inputs to different menus or to the digital video recorder. It should be noted that the remote control device 750 may be a simplified remote control device from those of a normal set top box in a residential environment.

Figure 9:
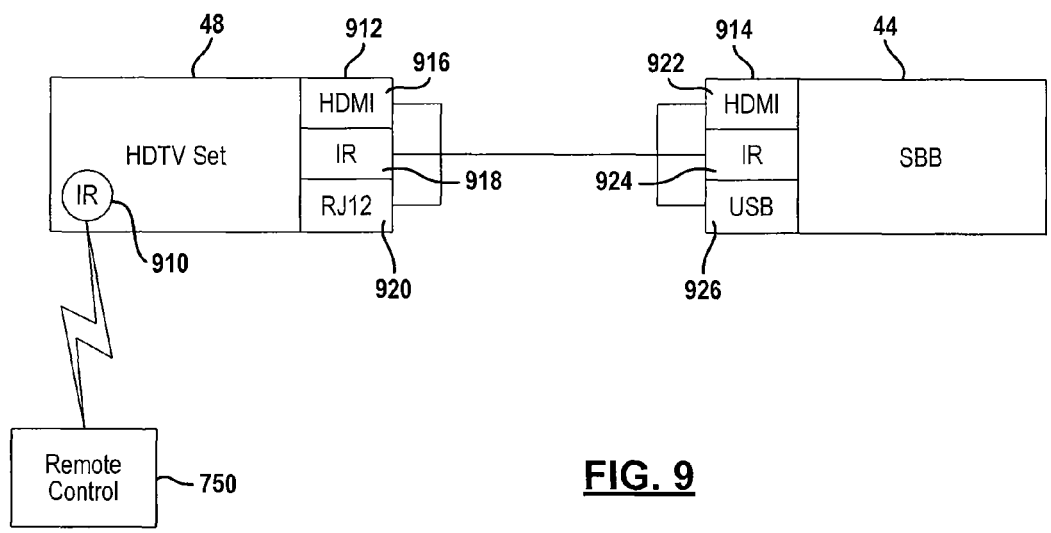
FIG. 9 is a block diagrammatic view of a method for communicating between a display device and a setback box.

Referring now to FIG. 9, a controlled device such as the user receiving device and a display device 48 such as a high-definition television set are illustrated having input and output ports. The remote control device 750 communicates using infrared which is detected by the display device 48 with an infrared detector 910. The remote control 750 generates a key code based on the key selected. The key code is communicated to the infrared detector 910 which in turn communicates the signal to a transceiver 912. Typically, a display device 48 may only include one transceiver for communicating with a transceiver 914 of a setback box. The transceiver 912 may communicate using different formats such as electrical signals such as HDMI 916 or RJ12 920 or IR signals. The transceiver on the user receiving device 914 may include HDMI 922, infrared 924, or a universal serial bus (USB) signals 926, which are also electrical. Of course, more than one transceiver may be provided on a display device 48 or user receiving device 44. Typically, a high-definition television set converts the code of the signal and highly processes the signal from the remote control device. In this example, the remote control signal is merely passed through the display device 48 to the output. If the display device 48 recognizes the signal, functions corresponding to the key code may be taken at the display device. For example, a volume control button may be processed directly at the display device 48 for increasing or decreasing the volume from the display. Other signals intended for the setback box 44 may not be acted upon by the display device 48. These signals may be passed directly to the transceiver 912 where they are transmitted to the transceiver 914 of the user receiving device 44 and processed therein. In response, the controlled device performs a function. A response signal to the key code may also be generated.

Figure 10:
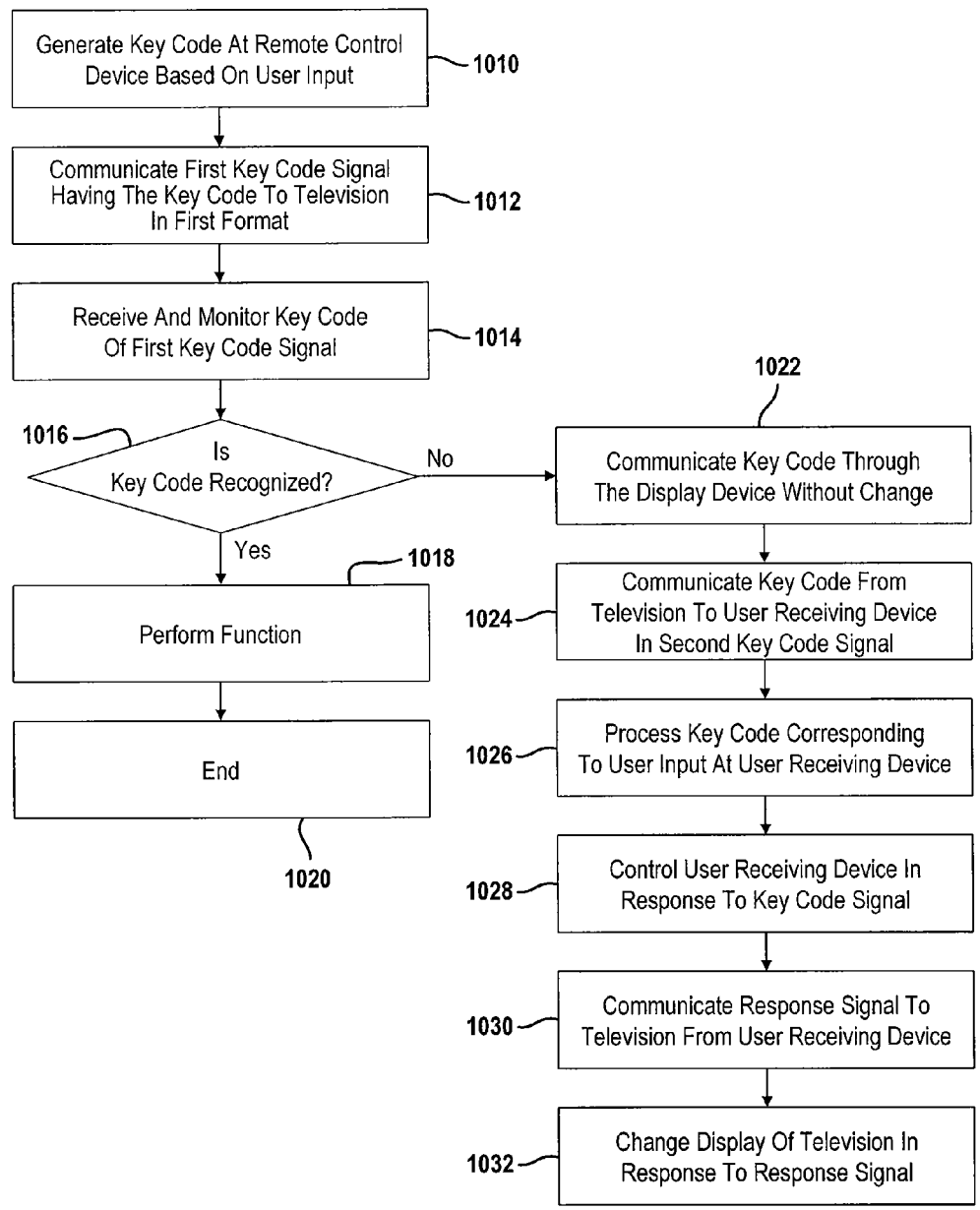
FIG. 10 is a flowchart of a method for operating the system of FIG. 9.

Referring now to FIG. 10, the process for communicating between the user receiving device 44. The controlled device may also be a digital video recorder, a setback box or a set top box. The display device 48 may be a television or monitor. In step 1010, a key code is generated at the remote control device based upon a user input. The user input is generated from the selection of a button or switch of the remote control device. In step 1012, the key code is communicated to the television in a first key code signal corresponding to the key code. The first key code signal may be infrared. In step 1014, the first key code signal is monitored. If the key code is recognized by the display device in step 1016, step 1018 performs the function designated by the key code. Recognizing the key code corresponds to comparing the key code to a control code for the display device. Step 1018 is performed when the key code corresponds to a control code for the display. After step 1018, step 1020 ends the process.

Referring back to step 1016, when the key code is not recognized, the key code may be communicated to a second key code signal in step 1022. The key code is formed into a second key code signal that may be in a different physical form. Although the transmission format is changed, the actual code or representation of the code is not changed. That is, the key code is passed through the system without reprocessing or being changed. After step 1022, the key code is communicated from the television or display device to the user receiving device 44 in a second key code signal. In step 1026, the key code in the second key code signal is processed at the user receiving device. In step 1028, the user receiving device is controlled in response to the key code. In step 1030, a response signal may be generated from the user receiving device. The response signal may be used to change the display of the television in step 1032. The display of the television may be changed in various ways including forming a selection, generating a screen display for a program guide, initiating a menu change, or the like.

Figure 11:
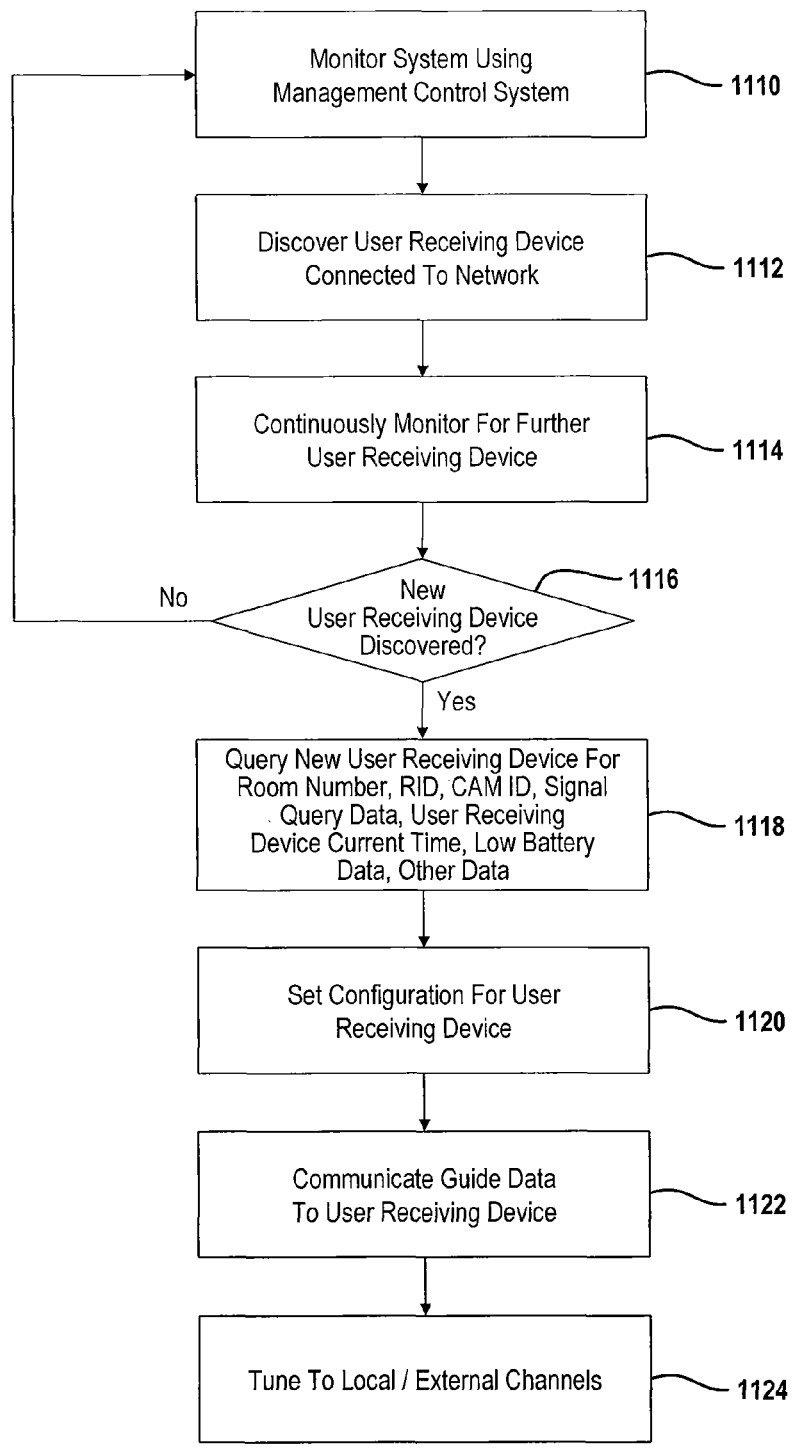
FIG. 11 is a flowchart of a method for adding and discovering new channels at the user receiving device.

Referring now to FIG. 11, a method for adding user receiving devices to the system is set forth. In step 1110, the system is monitored using the management control system. In step 1112, a user receiving device is discovered that is connected to a network. In step 1112, the user receiving devices may generate signals through the network that they have been connected to the network. The management control system recognizes the new user receiving device. In step 1114, the management control system continuously monitors for other user receiving devices in the network. When a new user receiving device is discovered in step 1116, step 1118 queries the new user receiving device for various identifying data that may include, but is not limited to, a number, a receiver identifier, a conditional access module identifier, a signal query data, user receiving device current time, low-battery data, and other data. After a new receiving device is obtained, the user receiving device may be configured by the management control system. To configure the user receiving device, management control system data may be provided for various functions. For example, the user partition of the digital video recorder may be erased, a favorite channel list may be provided and other functions may also be adjusted by the management control system. In step 1122, guide data may be communicated to the user receiving device. The external guide data may be communicated from the satellite. Local guide data may be communicated from the local headend so that local channels may be accessed by the user receiving device. Local channel data may be communicated using control command that includes tuning data to allow the user receiving device to join an IP multicast of the local channel signal. The tuning data may include a local channel name, local channel multicast address, description duration and a group identifier. The control command instructs one or more user receiving devices to add the local channel data to the memory of the user receiving device. External guide channel data and local guide channel data are stored within the user receiving device. In response to the guide data, local channels or external channels may be tuned to, based on the guide data.

Figure 12:
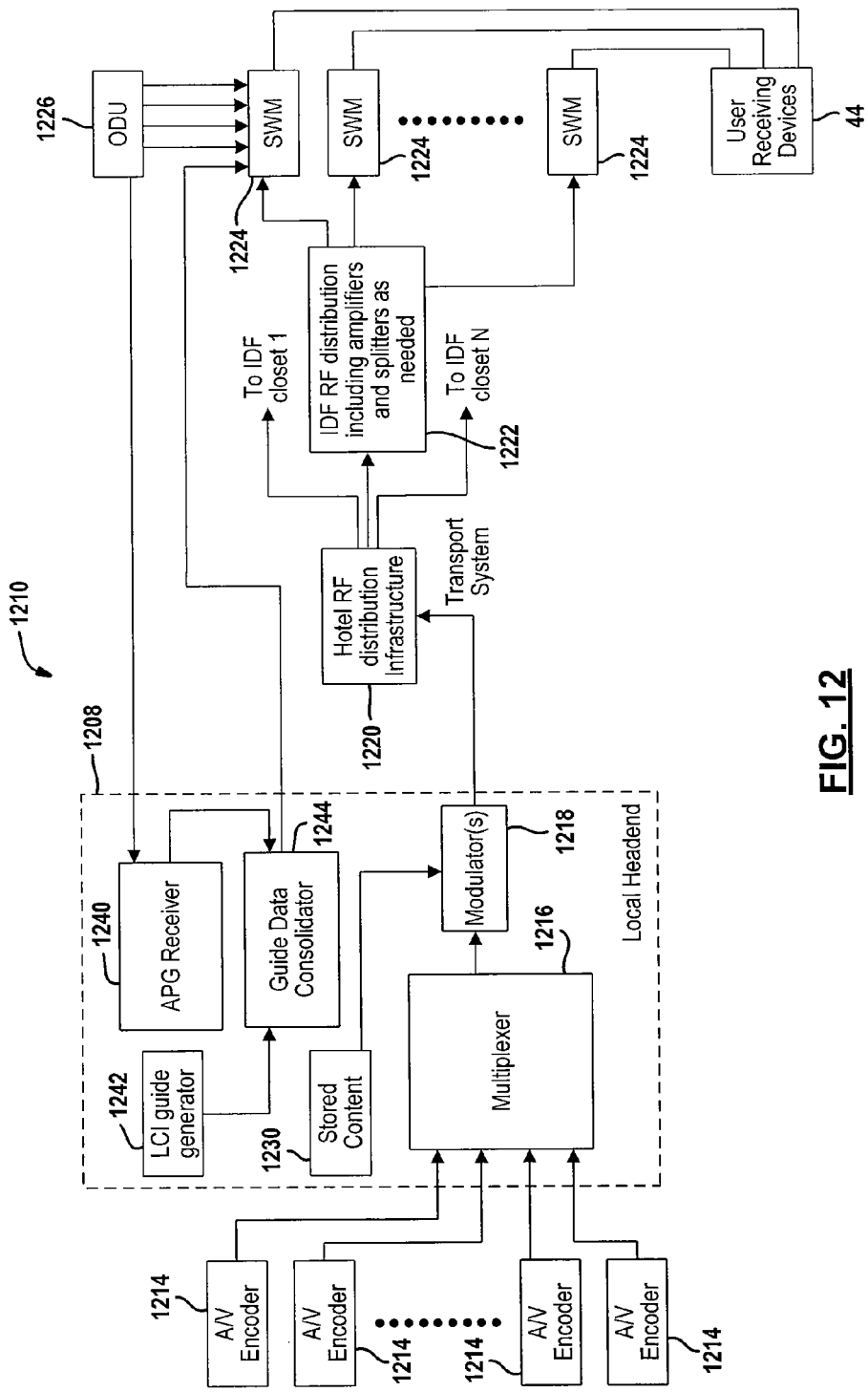
FIG. 12 is a block diagrammatic view of an RF aggregated distribution system.

Referring now to FIG. 12, various means for distributing guide data, local channels and other content may be provided in the framework of the above-mentioned description. FIG. 12 is a specific embodiment for an RF aggregated content distribution system 1210 wherein the local channels and local channel guide data are communicated in an RF system through a network.

The RF aggregated content distribution system 1210 includes a plurality of encoders 1214 for encoding local content. The local headend 1208 includes a multiplexer 1216 that is in communication with the encoders 1214. The multiplexer 1216 may generate an MPEG-2 multiplexed signal. Of course other types of encoding may be provided. The multiplexer 1216 may communicate the multiplexed signal to a modulator 1218. The modulator 1218 may modulate the signal to a desired RF frequency and thus form a transport stream. The transport stream from the modulator 1218 is provided to the hotel RF distribution infrastructure 1220. The hotel RF distribution infrastructure 1220 may be in communication with an intermediate distribution facility 1222. The intermediate distribution facility RF distribution system may include various amplifiers and splitters as required. The intermediate distribution facility 1222 may communicate the RF signals to a single-wire multi-switch switch module (SWM) 1224. The switch module 1224 may be provided based upon the number of end user receiving devices. Each switch module 1224 may service a predetermined number of user receiving devices. In one constructed embodiment, eight user receiving devices may be in communication with one switch module 1224.

The switch modules 1224 may be in communication with an outdoor unit 1226 which may include a receiving antenna. The outdoor unit 1226 communicates signals from the satellite transponders to the switch modules 1224 as described above in FIG. 6. The switch modules 1224 may use the auxiliary input port for receiving the RF local channel content signals.

Referring back to the local headend 1208, stored content in a memory 1230 may also be provided to the modulator 1218 and communicated to through the hotel RF distribution infrastructure 1220, the intermediate distribution facility 1222, and the single-wire multi-switch module 1224.

The outdoor unit 1226 may also be in communication with an advanced program guide (APG) receiver 1240. The APG receiver 1240 may receive program guide data from the external source such as the external headend 12 through the satellite 18 illustrated in FIG. 1. The local headend 1208 may also include a local content insertion guide generator 1242. The local content insertion guide generator 1242 generates guide channel data for the local content insertion channels generated at the local headend. A guide data consolidator 1244 may be in communication with the APG receiver 1240 and the LCI guide generator 1242. The guide data consolidator 1244 aggregates the local content guide data and the external program guide data from the APG receiver 1240. The aggregated guide data may be provided to the switch module 1224. An auxiliary input of the switch module 1224 may be used for receiving the aggregated guide data. The aggregated program guide data may look like a virtual satellite network and act as "channel 1" which is used to transmit program guide data to the user receiving devices. In this manner, the aggregated guide data replaces the guide data from the satellite and thus for "channel 1" the user receiving devices 44 are configured to obtain the program guide data from channel 1 at the auxiliary input of the single-wire multi-switch module 1224.

The output of each switch module 1224 may be provided to a plurality of user receiving devices 44. The number of switch modules varies depending on the size of the building or property serviced by the system.

Figure 13:
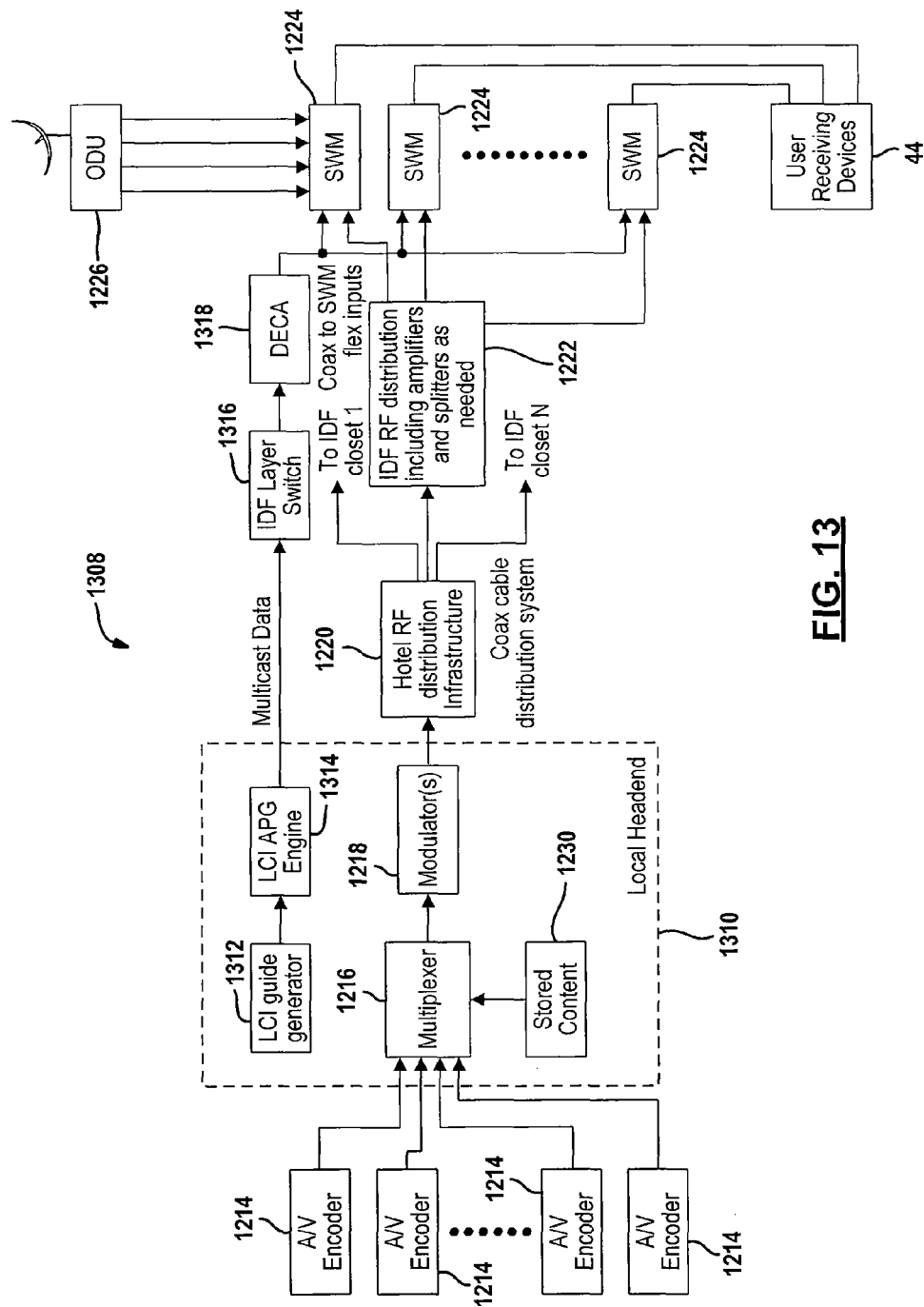
FIG. 13 is a block diagrammatic view of a first embodiment of an RF and IP aggregated distribution system.

Referring now to FIG. 13, a hybrid aggregated content distribution system 1308 for communicating program guide data by way of an IP network and local channels by radio frequency (RF) is set forth. In this embodiment, a local headend 1310 is illustrated having similar components to FIG. 12 for the encoder 1214, the multiplexer 1216, the modulator 1218, the hotel distribution infrastructure 1220, the intermediate distribution facility 1222, and the switch modules 1224. In this embodiment, the outdoor unit 1226 provides signals to the single-wire multi-switch modules 1224 in a similar manner to FIG. 12.

In this embodiment, the local headend 1310 includes a local content insertion guide generator 1312 that generates guide data for the local content channels. An LCIAPG engine 1314 formats guide data in the proper format such as properly formatted objects. The objects are also formatted in IP format.

The IP formatted grid data is communicated in an IP multicast stream. The local content insertion program guide data in IP format is communicated to an intermediate distribution facility layer switch 1316. A conversion module 1318 converts the IP multicast signal to a coaxial signal for input into an auxiliary input of the single-wire multi-switch module 1224. For this embodiment, the user receiving device 44 has an IP tuner and is not required to have a network tuner. In the embodiment illustrated in FIG. 12 no network tuner is required. The conversion module 1318 converts the IP local channel signal to a coaxial signal by modulating the IP multi-task signal. The IP local channel signal is modulated using a frequency different than the frequencies used for modulating the external channel signals. As mentioned above, the local channel signal and the external channel signals may be combined within the single wire multi-switch 1224 or in a combiner external to the single wire multi-switch 1224. This was illustrated in FIG. 6. The combiner 650 and the SWM modules 1224 are all considered part of a switch module.

Figure 14:
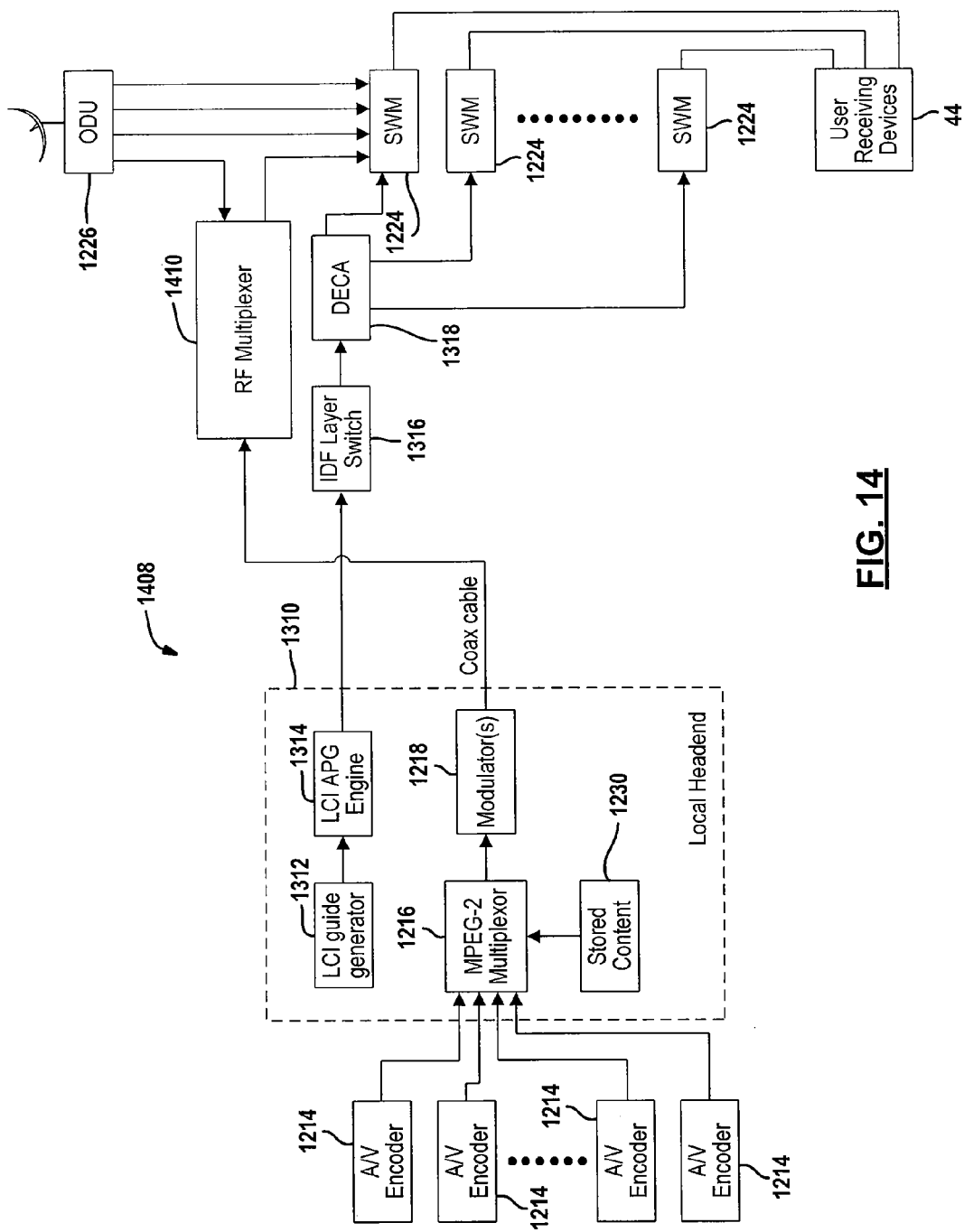
FIG. 14 is a block diagrammatic view of a second embodiment of an RF and IP aggregated distribution system.

Referring now to FIG. 14, the same elements from FIG. 13 are labeled with the same reference numerals. This embodiment is also referred to as a hybrid system since the local channels are distributed by RF and local guide data by IP. In this configuration, the aggregated content distribution system 1408 includes the local headend illustrated in FIG. 13. Likewise, the delivery of the local content insertion program guide data is also the same as FIG. 13. However, in this example, an RF multiplexer 1410 receives the modulated signal from the modulator 1218. A coaxial cable may be used to communicate the modulated signal to the RF multiplexer. The modulated signal may be modulated to a frequency that corresponds to an unused transponder frequency of the satellite. One of the outputs of the outdoor unit is also in communication with the RF multiplexer 1410. The local content channel signals are multiplexed with the signals from the outdoor unit and provided to one of the regular inputs to the switch module 1224. Thus, the multiplexed signal appears to the switch module as originating from the satellite. From the user receiving device perspective, the local content insertion guide data and the program guide data from the external source appear together and are received in the usual manner for a user receiving device with the exception that the local guide is provided through the auxiliary input of the multi-switch.

Figure 15:
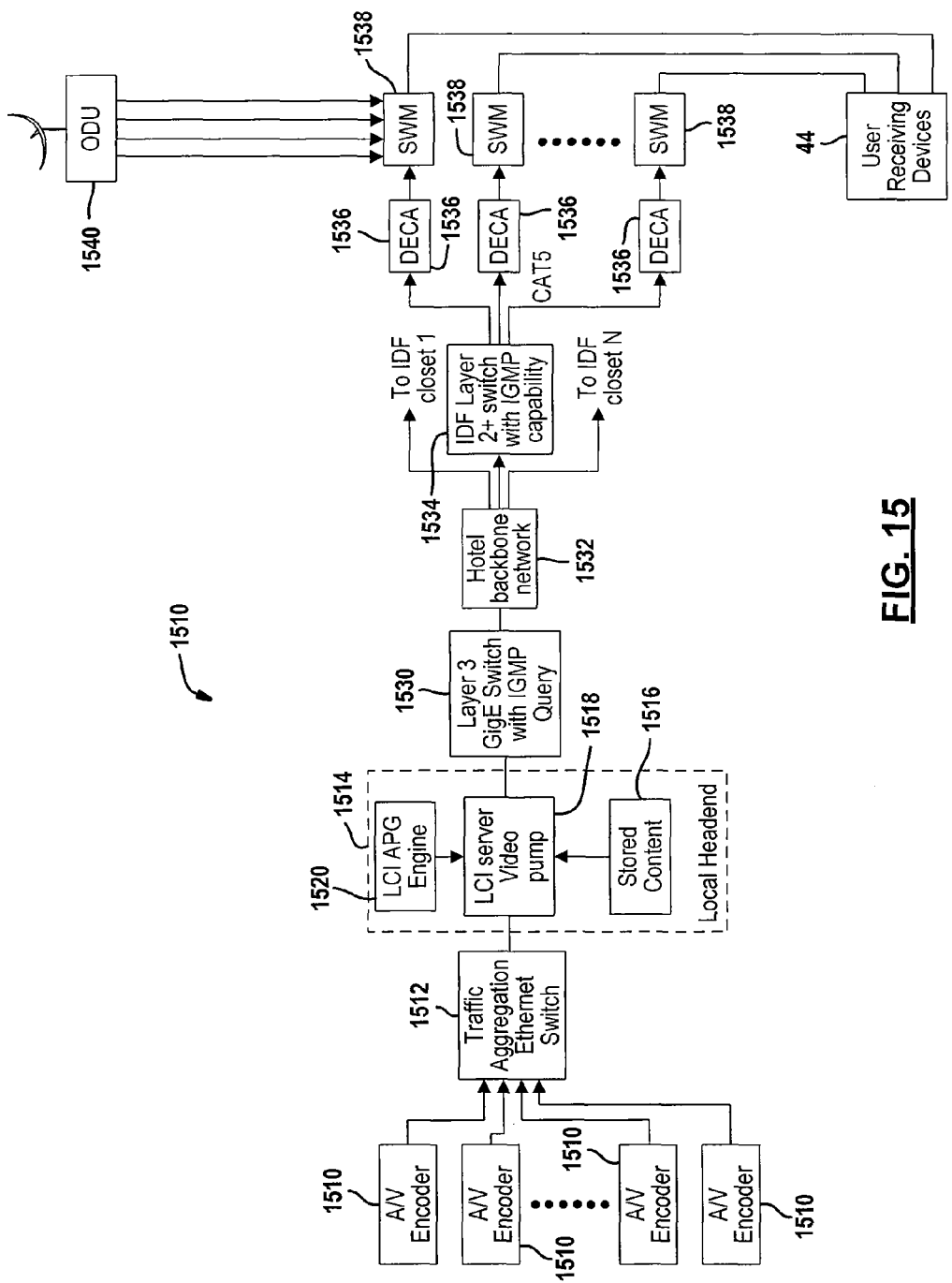
FIG. 15 is a block diagrammatic view of an IP aggregated distribution system according to the present disclosure.

Referring now to FIG. 15, another embodiment of the system is set forth which uses IP to distribute the local channels and guide data. In this embodiment, the encoders 1510 encode the local channel signals into IP signals that are communicated to an Ethernet switch 1512. The Ethernet switch 1512 is in communication with a server 1514 that may also have stored content 1516 therein. The stored content 1516 is in communication with a local content insertion server video pump 1518. A local content insertion program guide engine 1520 is also in communication with the video pump 1518. Both the guide data and the local content channels are communicated to a "layer 3" switch 1530. The layer 3 switch 1530 is capable of communicating multicast signals through a network. The layer 3 switch allows other users to join the multicast distribution of the local content signals and guide data signals.

The hotel backbone network 1532 receives the output of the switch 1530. The hotel backbone network 1532 communicates the IP program guide data signals and the channel signals to an intermediate distribution facility layer 2 switch 1534. Because of the IP nature of the channel and guide channels, category 5 (CAT 5) cables may be used as part of the hold infrastructure. Because the signals are in an IP format, a conversion module 1536 is used to convert the signals into a coaxial format to be distributed to the switch modules 1538. Thus, coaxial cables may be used to distribute the signals from the conversion modules 1536 to the switch modules 1538. The outdoor unit 1540 provides the single-wire multi-switches 1538 with external channel signals from the satellite or other distribution source.

Referring now to FIG. 16, a screen display 1610 of a program guide is set forth. In this simplified example, a channel column 1612, a network column 1614, and time slot columns 1616 and 1618 are provided. The row 1620 having channel 7 corresponds to the network "ABC" in which a movie is provided at 8:00 p.m. In row 1622, hotel information is provided. Thus, by tuning to channel 8 the user receiving device displays the hotel information on the screen display associated with the user device. This may be a barker channel or video stream. Row 1624 also provides a local content channel. The local content channel in this configuration is for the Society of Engineers Conference video. Channel 1624 may not be available to all of the user receiving devices within the local system. The user receiving devices that have users associated with Society of Engineers may be provided with the conference video channel in row 1624. Another row 1626 belongs to a network "CBS" in which Survivor is broadcasted at 8:00 p.m. As can be seen by the screen display of the program guide, both local content and external content may be provided within a program guide and tuned to.

Figure 17:
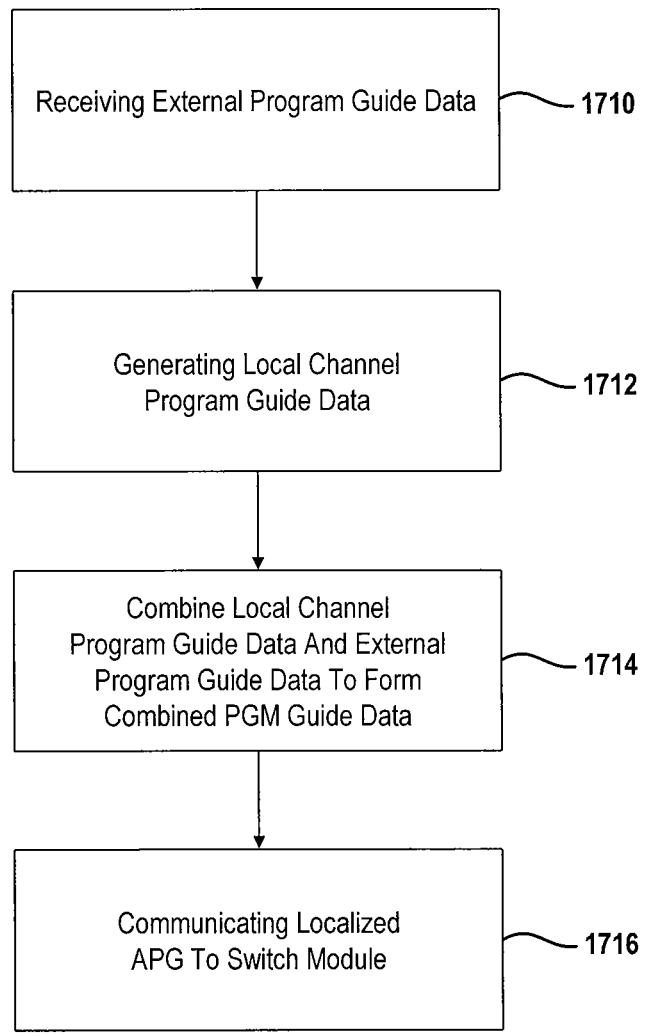
FIG. 17 is a flowchart of a method for communicating a local guide data signal to the switch module.

Referring now to FIG. 17, a method for obtaining the local program guide data and the external program guide data is set forth. In step 1710, external program guide data is received. As mentioned above and depending on the system configuration, the external program guide data may be received through a single-wire multi-switch module or received at another location within the headend.

In step 1712, local channel program guide data is generated at the local headend. The local guide data may be communicated with a control command. As mentioned above, a SHEF command may be used. The control command may include turning data that includes a channel identifier, channel name, channel number, description, duration, multicast tuning address and a group identifier. In response to the control command, the user receiving device may add the data to the memory of the user receiving device. In step 1714, the local program guide data and the external program guide data are ultimately combined to form consolidated program guide data in the memory of the user receiving device. In step 1716, the local program guide data is communicated to a switch module. Both external program guide data and local program guide data may be communicated to the single-wire multi-switch module. The guide data may be combined prior to the single-wire multi-switch or at the single-wire multi-switch using different inputs. Thus, the user receiving device may actually combine the data or receive the data at different times from the local channel program guide data and the external program guide channel data. Also, as mentioned above in FIGS. 12-15, the local program guide data may be communicated in an IP or RF format depending on the type of system.

Figure 18A:
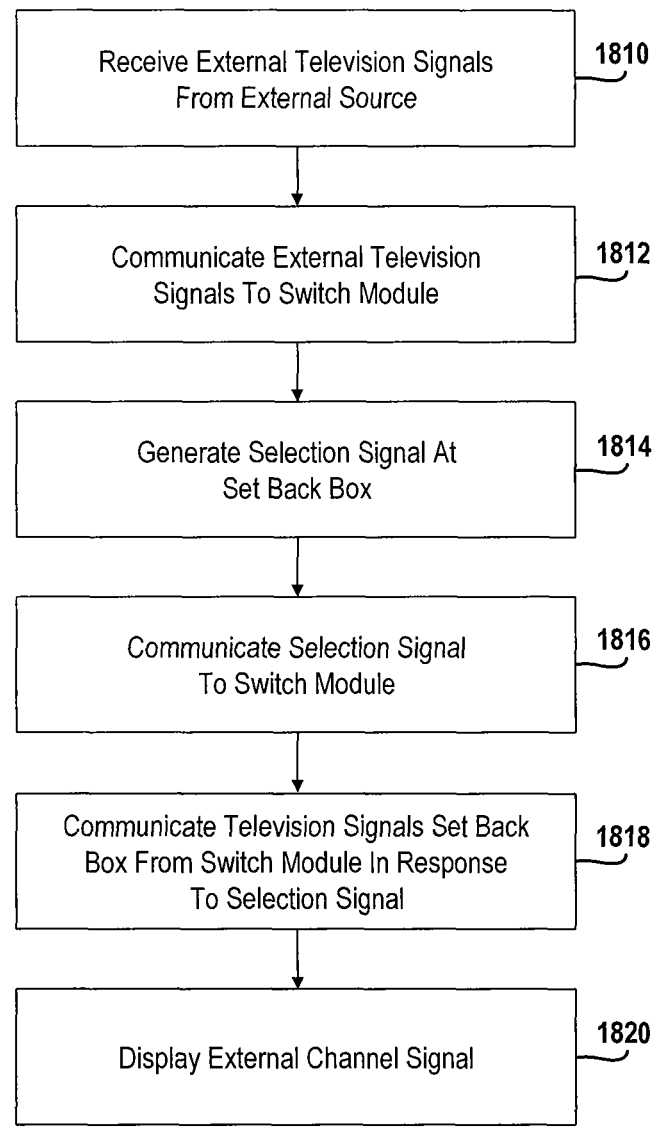
FIG. 18A is a flowchart of a method for receiving external channel signals.

Referring now to FIG. 18A, a method for controlling the system to receive external television signals is set forth. In step 1810, external television signals are received from the external source. In the present example, the outdoor unit provides external television signals from a satellite. Also as mentioned above, the present system may also be applicable to other types of systems including a cable system in which the television signals may be received from a cable system. Of course, other types of terrestrial wireless signals may be received, such as over-the-air signals. In step 1812, the external television signals are communicated to a switch module.

The switch module is used for distributing the external television signals to the user receiving devices. In step 1814, selection signals are generated at the setback box and communicated to the switch module in step 1816. In step 1818, the television signals are communicated to the setback box from the switch module in response to the selection signal. That is, the switch module determines the proper channel signal and communicates the signal through the frequency assigned to the setback box and the tuner of the set back box. In step 1820, the external channel is displayed on the display associated with the setback box.

Figure 18B:
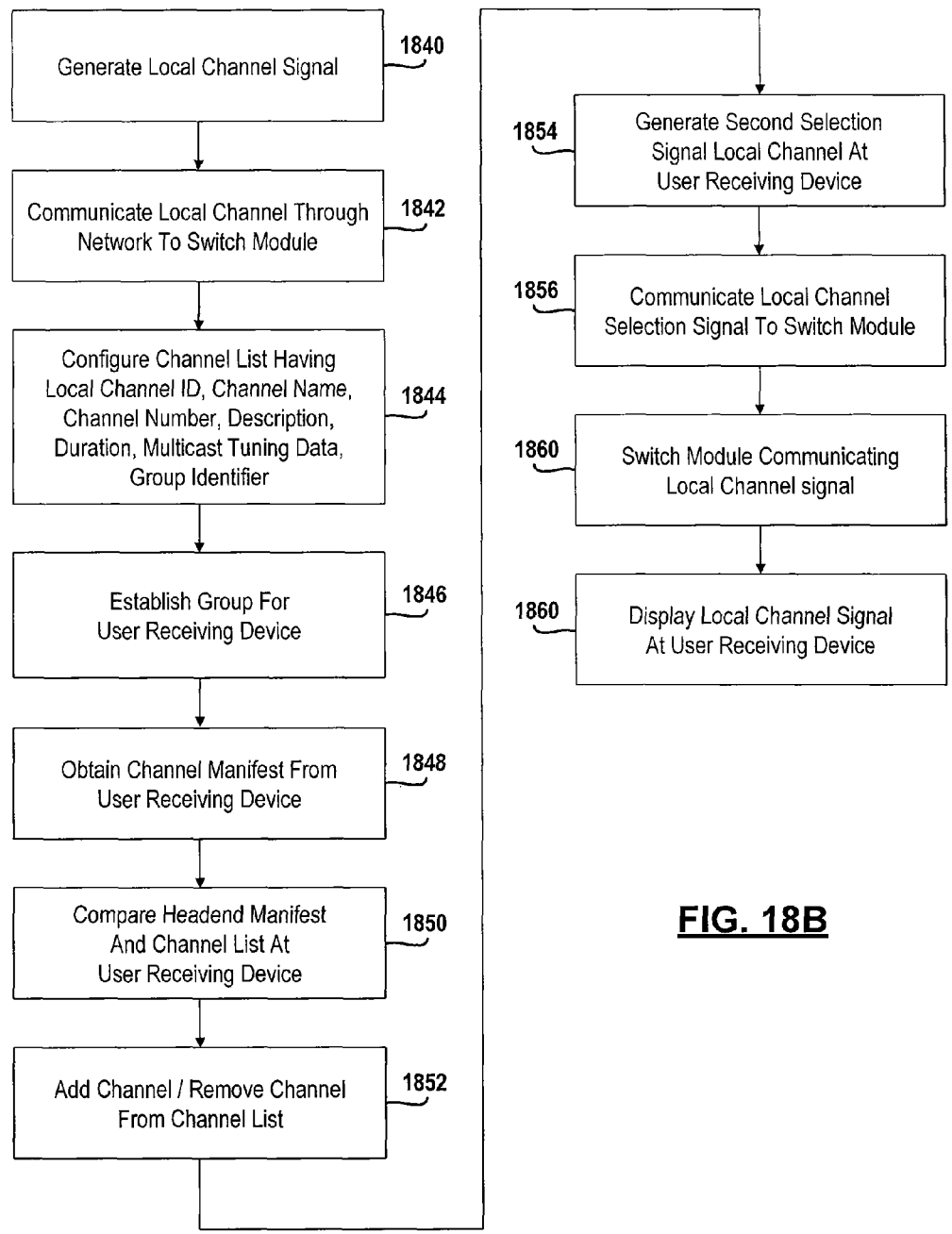
FIG. 18B is a flowchart of a method for receiving local channel signals.

Referring now to FIG. 18B, a method for displaying local channel signals is set forth. In step 1840, local channel signals are generated. As mentioned above, local channel signals may be generated in various manners including from stored content, live content and barker channel-type data. In step 1842, the local channel signal is communicated from the local headend through the local network of the building to a switch module. The local channel signal may be communicated in various ways, including IP or RF. In step 1844, a channel list having a local channel identifier, a channel name, a channel number, a description, duration, multicast tuning data, group and identifier data may be generated. The channel list and local channel data therein may be stored within the local headend.

In step 1846, a setback box may have a group established therefor. As mentioned above, various setback boxes may have a group established with other setback boxes. The setback boxes may have common configurations such as favorites channels. The setback box group may correspond to membership in a particular conference, members of a particular floor, or other arbitrary groupings. In step 1848, a channel manifest is obtained from the user receiving device. The channel manifest is a list of channels stored in the user receiving device which are accessible by the user receiving device. In step 1850, the channel manifest of the user receiving device is compared to a headend channel manifest which corresponds to the desired channel list for the user receiving device. In step 1852, channels may be added or removed from the local channel manifest in response to comparing in step 1850. More channels or additional channels may be added as needed. Channel data may be added to the program guide data of the user receiving device (and thus the channel manifest of the use receiving device) using a SHEF command generated in the local headend and communicating the SHEF command to the user receiving device 44. The SHEF command is a control command that provides tuning data to the user receiving device. The tuning data may include the local channel name, local channel multicast address, local channel identifier, description, duration, and group identifier. With the tuning data the channel can be added to the program guide data in the user device. A SHEF command may also be used to remove guide data from the guide data of the user receiving device. In step 1854, a second channel selection signal corresponding to a local channel is generated. The local channel selection signal is communicated to the switch module in step 1856. In step 1858, the switch module is configured to retrieve the local channel signal and the local channel signal is communicated through the frequency assigned to the user receiving device. In step 1860, the local channel signal is displayed at the setback box.

Figure 19:
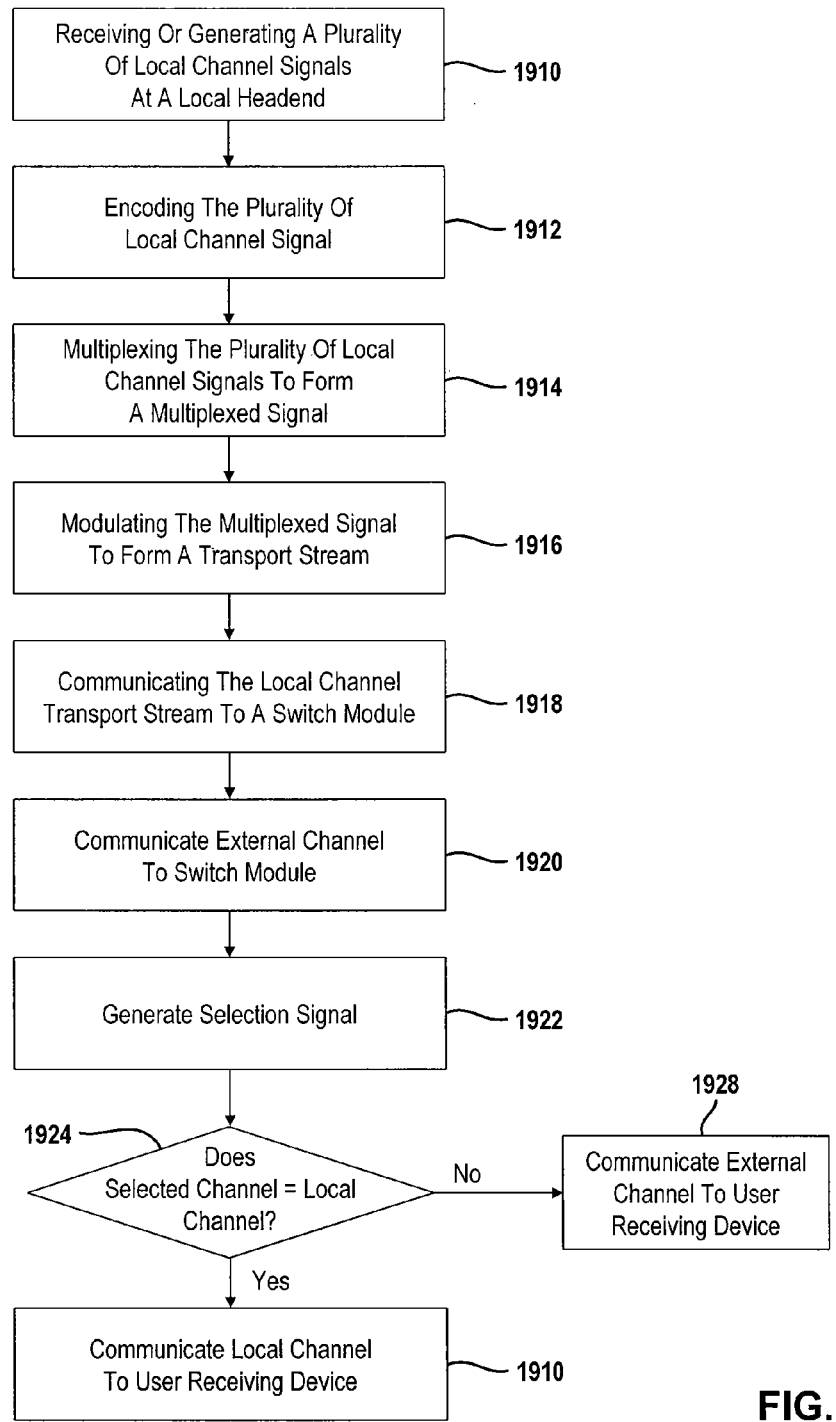
FIG. 19 is a flowchart of a method for operating the RF system of FIG. 12.

Referring now to FIG. 19, a method for operating the system of FIG. 12 is set forth. In step 1910, the local channel signals are either locally generated or received. In step 1912, the local channel signals are encoded. As mentioned above, various types of encoding may be used depending upon the desired result at the user receiving device. For example, MPEG-2 or MPEG-4 encoding may be used. In step 1914, the encoded local channel signals are multiplexed together to form a multiplexed signal. In step 1916, the multiplexed signals are modulated to form a transport stream. The transport stream of local channel signals is communicated to a switch module in step 1918. In step 1920, external channel signals are communicated to the switch module. In step 1922, a selection signal is generated at the user receiving device. The guide data is used to form the selection signal so that the requested channel is communicated to the user receiving device. In step 1924, it is determined whether the selected channel signal and the selection signal correspond to a local channel. If the local channel signal does correspond to a local channel, step 1926 communicates the local channel to the user receiving device. Referring back to step 1924, when the selected channel does not correspond to a local channel, step 1928 communicates the external channel to the user receiving device. It should be noted that the switch module recognizes the signal and knows the source of the desired local channel signal or external channel signal. That is, the switch module is able to determine the source of the desired signal such as one of the external inputs or one of the auxiliary inputs. In either case, the frequency for the particular user receiving device is used to communicate the signal by modulation to the user receiving device.

Figure 20:
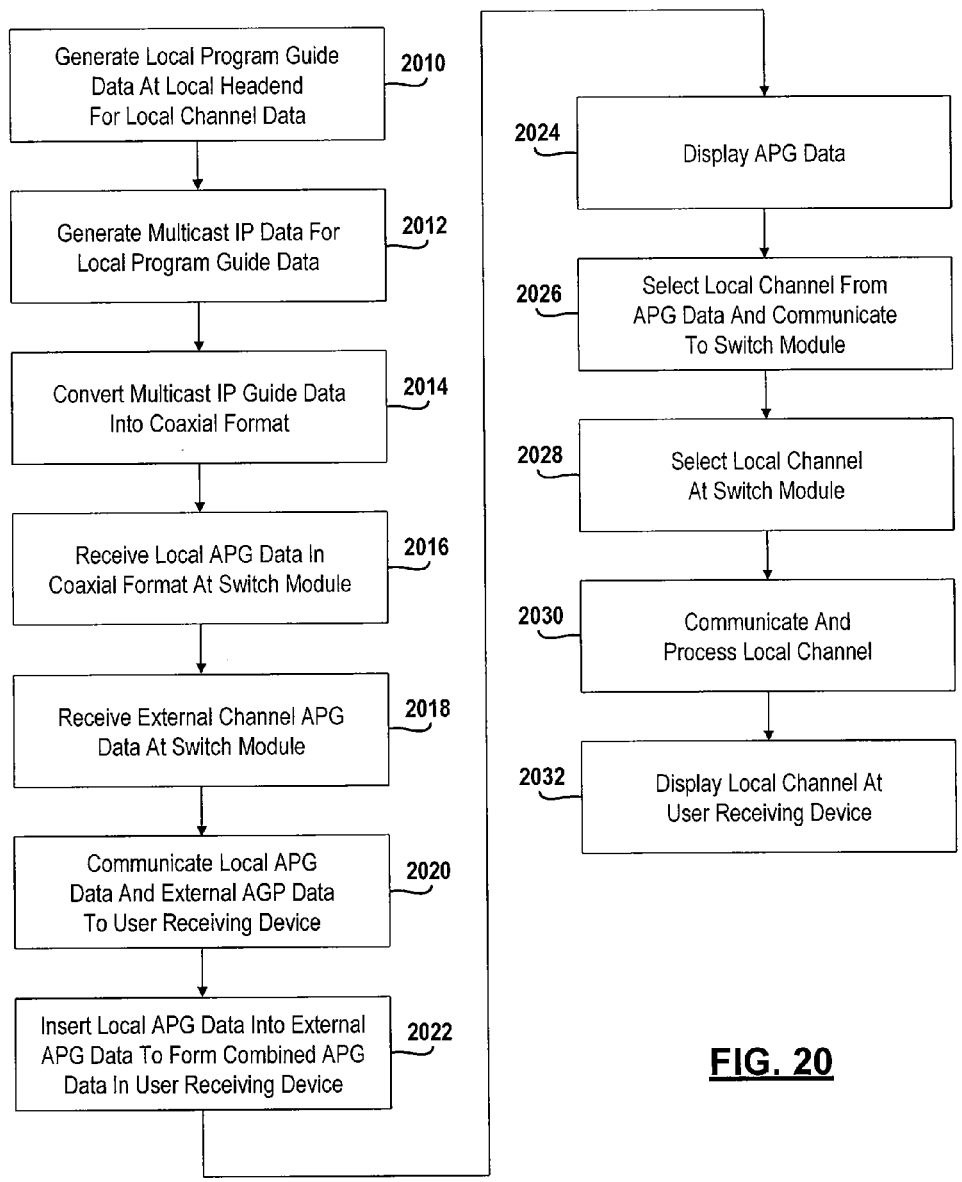
FIG. 20 is a flowchart of a method for operating the hybrid RF system of FIG. 13.

Referring now to FIG. 20, a method for operating the hybrid system illustrated in FIG. 13 is set forth. In this example, local program guide data is generated at the local headend in step 2010. In step 2012, multicast IP data is generated for the local program guide data. The multicast IP data is communicated through the local network. The local channel guide data may be communicated using a control command that instructs the user receiving device to add the local channel guide data to the user receiving device guide data. In step 2014, the multicast IP guide data is converted into a coaxial format. This may be performed in the IP-to-coaxial converter discussed above. In step 2016, the local program guide data is communicated from the converter to the switch module. In step 2018, external channel program guide data is received at the switch module. In step 2020, the local program guide data and external guide data are communicated to the user receiving device. In step 2022, local program guide data is inserted into and combined with the external program guide data to form combined program guide data in the user receiving device. In step 2024, the program guide data is displayed on a display associated with the user receiving device. In step 2026, a local channel is selected from the guide data. The local channel selection is communicated to the switch module using RF in a coaxial cable. In step 2028, the local channel signal is selected at the switch module and, in step 2030, the local channel signal is communicated and processed as described above. In step 2032, the local channel signal is displayed at the display associated with the user receiving device.

Figure 21:
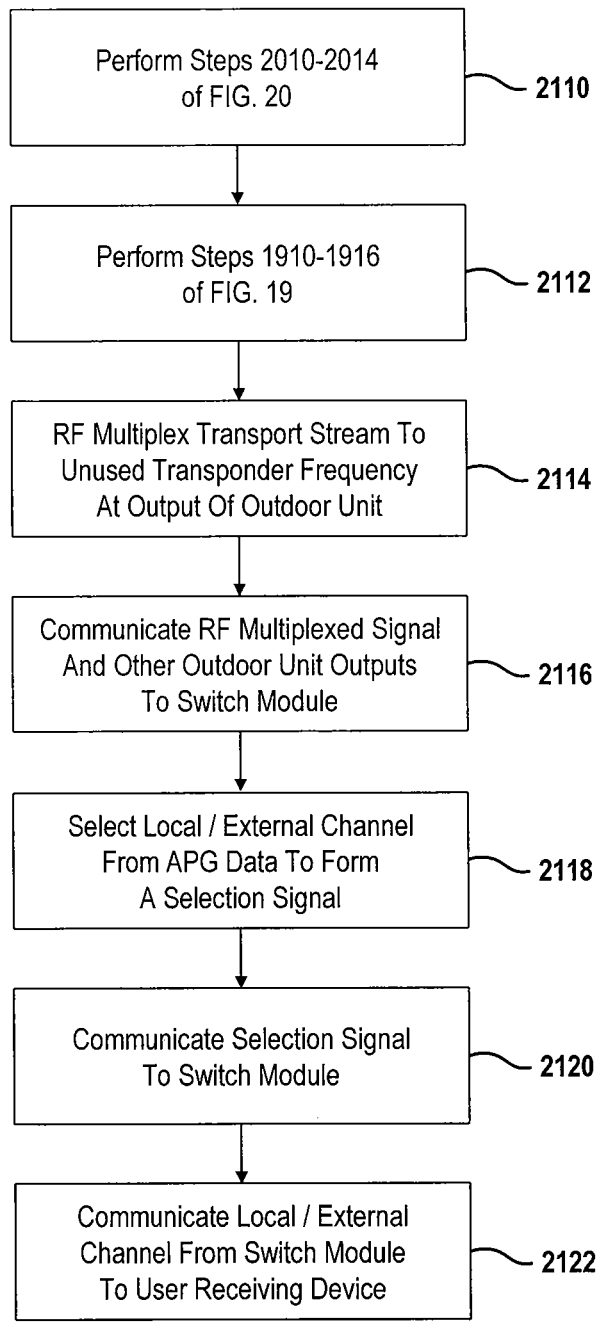
FIG. 21 is a flowchart of a method for operating the hybrid RF system illustrated in FIG. 14.

Referring now to FIG. 21, a method of operating the hybrid system illustrated in FIG. 14 is set forth. Step 2110 performs the first three steps of FIG. 20 in which local program guide data is generated and the multicast IP guide data is formed. As mentioned above, a control command is used to add the guide data for the local channel. The tuning data for the multicast stream is used to add the tuning data to the guide data of the user receiving device. Next, steps 1910-1916 of FIG. 19 are performed. In these steps, the local channel signals are generated and communicated in RF format modulated into a transport stream in step 2112. The modulation may be performed to correspond to unused transponder frequency of the satellite signal. In step 2114, the transport stream is RF multiplexed at an output of the outdoor unit. This may be performed physically outdoors or within the building of the system prior to the switch module. In step 2116, the RF multiplexed signal and the other outdoor unit outputs are communicated to the switch module. In step 2118, a local channel or external channel is selected from the program guide data to form a selection signal. In step 2120, the selection signal is communicated to the switch module. In step 2122, the local or external channel is communicated from the switch module to the user receiving device through the frequency assigned to the user receiving device.

Figure 22:
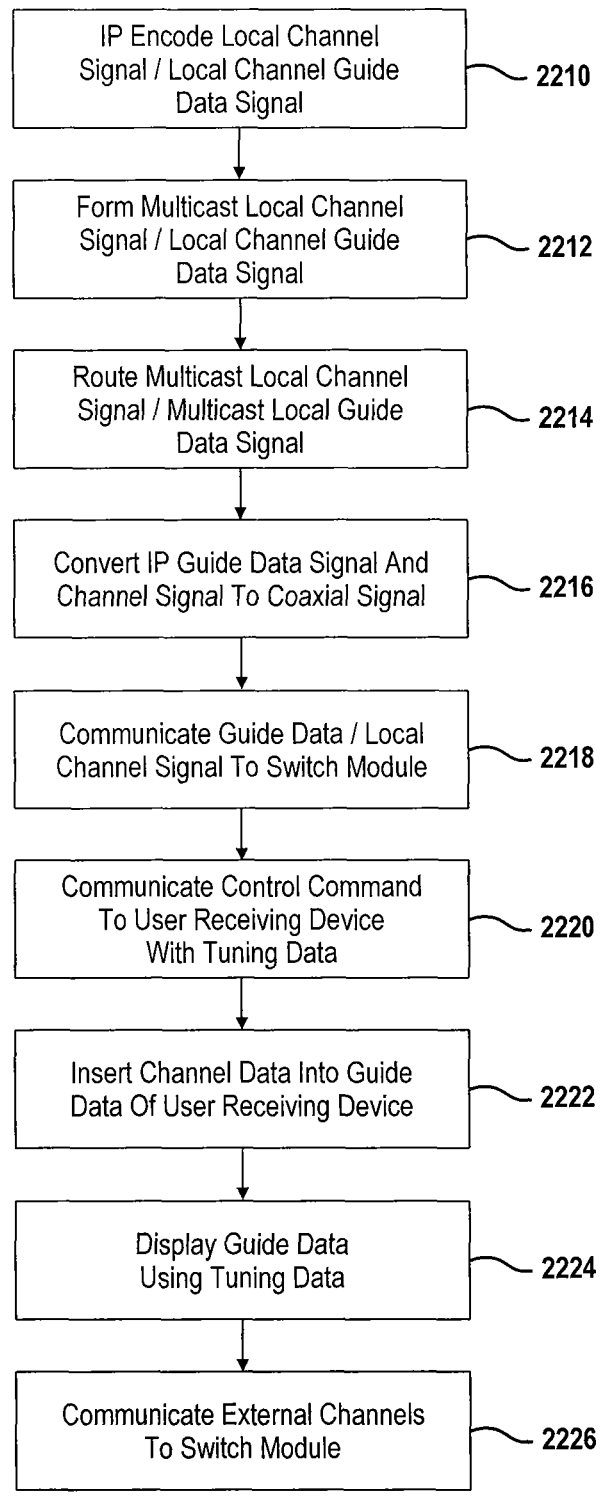
FIG. 22 is a flowchart of a method for operating the IP system illustrated in FIG. 15.

Referring now to FIG. 22, a method of operating the system of FIG. 15 is set forth. In this system, both the guide data and local channel are distributed by IP. In step 2210, the local channel signals are IP encoded. Also, local channel guide data signals are also IP encoded. In step 2212, a multicast signal of the local channel signal is formed. Also, a local guide channel data signal is converted to an IP signal and is also an IP signal. In step 2214, the multicast local channel signal and the local guide data signal are routed through the switching networks of the building 22 through the aggregated channel distribution system. In step 2216, the IP guide data signal and the IP channel signals are converted to a coaxial signals using a conversion module. In step 2218, the converted guide data and the converted local channel signals are communicated to the switch module. The guide data may be added to the guide data of the user receiving device using a control command. The control command may use the SHEF format described above. The control command is communicated to the user receiving device with tuning data in step 2220. In response to the control command, the tuning data for the channel is added into the memory of the user receiving device with the other program guide data in step 2222. In step 2224, the guide data is generated on the display associated with the user receiving device using at least some of the tuning data. In step 2226 the external channel signals are also communicated to the switch module. After the switch module receives both the external channels, the guide data and the local channel signals, the selection of an external channel or a local channel is performed at the user receiving device as set forth above. Further, the guide data is also communicated to the user receiving device in a similar manner.

Figure 23:
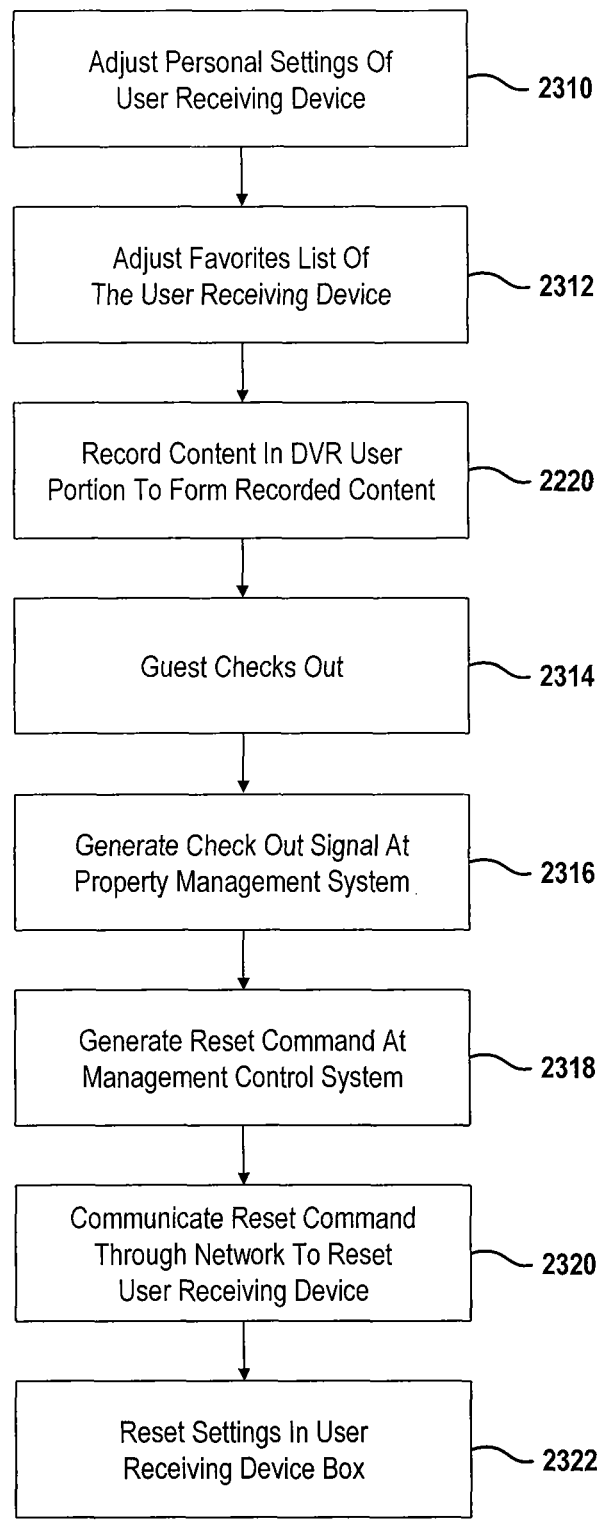
FIG. 23 is a flowchart of a method for adjusting the user receiving device.

Referring now to FIG. 23, a method of resetting a user receiving device using a control command is set forth. In step 2310, personal settings of the user receiving device may be adjusted by the guest of the local content distribution system. In step 2312, one example of adjusting the settings of the user receiving device is set forth. Adjusting the settings may include adjusting the favorites list of the user receiving device. The favorites list may be adjusted based upon membership in a group within the local content distribution system. The favorites list may be adjusted at the management control system based on a group associated with the user.

In step 2314, the content may be recorded in the user portion of the digital video recorder to form recorded content. In step 2316, when a guest of the hotel or other user of the system leaves the facility, the property management system may generate a checkout signal in step 2318. The checkout signal at the property management system may be communicated to a management control system and a reset command signal may be generated at the management control system in step 2320. In step 2322, the reset command signal may be communicated through the network to the user receiving device. The reset command signal may reset the settings in the user receiving device in step 2324. In this example, the user partition of the digital video recorder and the favorites list may be reset. Further, other types of settings may also be reset or removed including resetting parental controls, resetting a favorite list of the user receiving device, resetting closed captioning settings, removing content from a user portion of a digital video recorder of the user receiving device and resetting interactive applications.

While particular embodiments of the disclosure have been shown and described, numerous variations and alternate embodiments will occur to those skilled in the art. Accordingly, it is intended that the disclosure be limited only in terms of the appended claims.

What is claimed is:

1. A method comprising:
generating a control signal at a management control system of a local headend;
generating a modulated signal at a frequency unused by a satellite and an outdoor unit external to the local headend, said modulated signal comprising a plurality of local channels at the local headend;
simultaneously communicating the control signal to a group of user receiving devices through a switch module of a local network while communicating the modulated signal from the local headend to a first multiplexer, wherein the first multiplexer is separate from the switch module;
at the first multiplexer, receiving a first plurality of external signals from the outdoor unit and multiplexing the modulated signal and the first plurality of external signals to generate a first output signal;
receiving a second plurality of external signals from the satellite at the outdoor unit;
communicating the first output signal and the second plurality of external signals to a second multiplexer, wherein the second multiplexer is in the switch module;
multiplexing the first output signal and the second plurality of external signals via the second multiplexer to form a second output signal;
transmitting the second output signal from the switch module to the at least one user receiving device in the group of user receiving devices;
receiving the output signal by at least one user receiving device in the group of user receiving devices; and
controlling the group of user receiving devices in response to the control signal.

2. The method as recited in claim 1 wherein the control signal is generated at the management control system using a hypertext transfer protocol.

3. The method as recited in claim 1 wherein the generating of the control signal comprises generating a channel insertion signal.

4. The method as recited in claim 1 wherein the generating of the control signal comprises generating a channel deletion signal.

5. The method as recited in claim 1 further comprising:
generating a user device reset signal for resetting user adjusted settings of at least one user receiving device in the group of user receiving devices; and
communicating the user device reset signal to the at least one user receiving device in the group of user receiving devices to reset the user adjusted settings.

6. The method as recited in claim 1 wherein the generating of the control signal comprises generating a user device reset signal for erasing a user portion of data stored in a digital video recorder of the group of user receiving devices.

7. The method as recited in claim 1 further comprising, prior to the simultaneously communicating of the control signal to the group of user receiving devices, selecting the group of user receiving devices from an on-screen display associated with the management control system.

8. The method as recited in claim 1 further comprising, prior to the simultaneous communicating of the control signal to the group of user receiving devices, selecting user receiving devices associated with a floor in a building to be in the group of user receiving devices.

9. The method as recited in claim 1 further comprising, prior to the simultaneous communicating of the control signal to the group of user receiving devices, selecting user receiving devices associated with an organized group to be in the group of user receiving devices.

10. The method as recited in claim 1 wherein the control signal is simultaneously communicated to the group of user receiving devices through an IP infrastructure.

11. The method as recited in claim 1 wherein the control signal is simultaneously communicated to the group of user receiving devices through a single-wire multi-switch.

12. The method as recited in claim 1 wherein the control signal is simultaneously communicated to the group of user receiving devices through an IP infrastructure and an IP-to-coaxial converter module.

13. The method of claim 1, further comprising:
converting the modulated signal to a coaxial signal;
distributing the coaxial signal to a plurality of switch modules; and
forwarding the coaxial signal from the plurality of switch modules to the group of user receiving devices.

14. The method of claim 1, further comprising:
receiving a second plurality of external signals from the device external to the local headend at a plurality of switch modules;
multiplexing the second plurality of external signals and the output signal at the plurality of switch modules to generate a plurality of multiplexed signals; and
transmitting the plurality of multiplexed signals to the group of user receiving devices.

15. A system comprising:
a group of user receiving devices;
a first multiplexer;
a local headend in communication with the group of user receiving devices through a local network and comprises
a modulator configured to generate a modulated signal at a frequency unused by a satellite and an outdoor unit external to the local headend, wherein the modulated signal comprises a plurality of local channels, and
a management control system configured to generate a control signal and simultaneously communicate the control signal to the group of user receiving devices through a switch module of the local network while communicating the modulated signal from the local headend to the first multiplexer, wherein the switch module is separate from the first multiplexer, and
wherein the first multiplexer is configured to receive a plurality of external signals from the outdoor unit and multiplex the modulated signal and the plurality of external signals to generate a first output signal; and
said outdoor unit receiving a second plurality of external signals;
a second multiplexer multiplexing the first output signal and the second plurality of external signals to form a second output signal, wherein the second multiplexer is in the switch module;
wherein the switch module configured to receive the second output signal and provide the output signal to at least one user receiving device in the group of user receiving devices,
wherein the group of user receiving devices are controlled in response to the control signal.

16. The system as recited in claim 15 wherein the management control system generates the control signal based on a hypertext transfer protocol.

17. The system as recited in claim 15 wherein the control signal comprises a channel insertion signal.

18. The system as recited in claim 15 wherein the control signal comprises a channel deletion signal.

19. The system as recited in claim 15 wherein the control signal comprises a user device reset signal for resetting a user device configuration in a user receiving device of the group of user receiving devices.

20. The system as recited in claim 15 wherein the control signal comprises a user device reset signal for erasing a user portion of data stored in a digital video recorder of the group of user receiving devices.

21. The system as recited in claim 15 further comprising a console for generating an on-screen display for selecting the group of user receiving devices.

22. The system as recited in claim 21 wherein the group of user receiving devices is selected at the console.

23. The system as recited in claim 22 wherein the group of user receiving devices is associated with a floor in a building.

24. The system as recited in claim 22 wherein the group of user receiving devices is associated with an organized group.

25. The system as recited in claim 22 wherein the management control system simultaneously communicates the control signal to the group of user receiving devices through an IP infrastructure.

26. The system as recited in claim 22 wherein the management control system simultaneously communicates the control signal to the group of user receiving devices through a single-wire multi-switch.

27. The system as recited in claim 22 wherein the management control system simultaneously communicates the control signal to the group of user receiving devices through an IP infrastructure and an IP to coaxial converter module.

28. A method comprising:
generating a control signal at a management control system of a local headend;
communicating the control signal to a user receiving device, said user receiving device comprising user adjusted settings;
controlling the user receiving device in response to the control signal, resetting the user adjusted settings at the user receiving device;
generating a modulated signal at a frequency unused by a satellite and an outdoor unit external to the local headend, said modulated signal comprising a plurality of local channels at the local headend;
subsequent to resetting the user adjusted settings at the user receiving device, communicating the modulated signal from the local headend to a first multiplexer;
receiving a first plurality of external signals from a satellite;
at the first multiplexer, multiplexing the modulated signal and the first plurality of external signals to generate a first output signal, wherein the first multiplexer is separate from a switch module; and
receiving a second plurality of external signals from the satellite at the outdoor unit;
communicating the first output signal and the second plurality of external signals to a second multiplexer, wherein the second multiplexer is in the switch module;

multiplexing the first output signal and the second plurality of external signals via the second multiplexer to form a second output signal;

transmitting the second output signal from the switch module to the user receiving device;

receiving the output signal at the user receiving device.

29. The method as recited in claim 28 further comprising:
receiving a check out signal from a property management system; and
wherein generating the control signal comprises generating the control signal in response to the check-out signal.

30. The method as recited in claim 28 wherein the user adjusted settings comprise parental controls.

31. The method as recited in claim 28 further comprising resetting a favorite list of channels in response to the control signal.

32. The method as recited in claim 28 further comprising resetting closed captioning settings of the user receiving device in response to the control signal.

33. The method as recited in claim 28 further comprising, in response to the control signal, removing content from a user portion of memory in a digital video recorder of the user receiving device.

34. The method as recited in claim 28 further comprising resetting interactive applications of the user receiving device in response to the control signal.

35. The method as recited in claim 28 further comprising communicating the control signal to a group of user receiving devices.

36. The method of claim 28, further comprising:
converting the modulated signal to a coaxial signal;
communicating the coaxial signal to the switch module; and
forwarding the coaxial signal from the switch module to the user receiving device.

37. The method as recited in claim 29 wherein the management control system is separate from the property management system.

38. The method as recited in claim 35 wherein the control signal is communicated to the group of user receiving devices through an IP infrastructure.

39. The method as recited in claim 35 wherein the control signal is communicated to the group of user receiving devices through a single-wire multi-switch.

40. The method as recited in claim 35 wherein the control signal is communicated to the group of user receiving devices through a single-wire multi-switch and an IP-to-coaxial converter module.

41. A system comprising:
a local headend comprising a management control system and a modulator;
a user receiving device in communication with the local headend; and
a first multiplexer separate from a switch module,
a management control system disposed within the local headend wherein:
the management control system generates a control signal and communicate the control signal to the user receiving device to reset user adjusted settings in the user receiving device,
the modulator is configured to generate a modulated signal at a frequency unused by a satellite and an outdoor unit external to the local headend, wherein the modulated signal comprises a plurality of local channels,
the local headend is configured to, subsequent to resetting the user adjusted settings at the user receiving device, communicate the modulated signal to the first multiplexer, and
the first multiplexer receives a plurality of external signals from a satellite through an outdoor unit, multiplexes the modulated signal and the plurality of external signals to generate a first output signal, and transmits the output signal to the user receiving device;
said outdoor unit receiving a second plurality of external signals;
a second multiplexer multiplexing the first output signal and the second plurality of external signals to form a second output signal, wherein the second multiplexer is in the switch module;
wherein the switch module is configured to receive the second output signal and provide the output signal to the user receiving device.

42. The system as recited in claim 41 further comprising a property management system communicating a check out signal to the management control system,
wherein the management control system generates the control signal in response to the check-out signal.

43. The system as recited in claim 41 wherein the management control system generates the control signal to reset parental controls of the user receiving device.

44. The system as recited in claim 41 wherein the management control system generates the control signal to reset a favorite list of channels at the user receiving device.

45. The system as recited in claim 41 wherein the management control system generates the control signal to reset closed captioning settings of the user receiving device.

46. The system as recited in claim 41 wherein the management control system generates the control signal to remove content from a user portion of memory in a digital video recorder of the user receiving device.

47. The system as recited in claim 41 wherein the management control system generates the control signal to reset interactive applications of the user receiving device.

* * * * *